US012719624B2

(12) United States Patent
Ren et al.

(10) Patent No.: US 12,719,624 B2
(45) Date of Patent: Aug. 25, 2026

(54) ENVIRONMENT SENSING USING RADIO FREQUENCIES

(71) Applicant: QUALCOMM Incorporated, San Diego, CA (US)

(72) Inventors: Yuwei Ren, Beijing (CN); Yin Huang, Beijing (CN); Hao Xu, Beijing (CN); Jiuyuan Lu, Beijing (CN); Chirag Sureshbhai Patel, San Diego, CA (US); Andrian Beletchi, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 432 days.

(21) Appl. No.: 17/907,656

(22) PCT Filed: May 25, 2021

(86) PCT No.: PCT/CN2021/095650

§ 371 (c)(1),
(2) Date: Sep. 28, 2022

(87) PCT Pub. No.: WO2021/238887

PCT Pub. Date: Dec. 2, 2021

(65) Prior Publication Data

US 2023/0188275 A1 Jun. 15, 2023

(30) Foreign Application Priority Data

May 25, 2020 (WO) ................ PCT/CN2020/092000
May 25, 2020 (WO) ................ PCT/CN2020/092001

(51) Int. Cl.
*H04W 72/25* (2023.01)
*H04B 1/40* (2015.01)
*H04L 5/00* (2006.01)

(52) U.S. Cl.
CPC ............. *H04L 5/0007* (2013.01); *H04B 1/40* (2013.01); *H04W 72/25* (2023.01)

(58) Field of Classification Search
CPC ................................ H04W 72/25; H04B 1/40
(Continued)

(56) References Cited

U.S. PATENT DOCUMENTS 11,075,786 B1 * 7/2021 Shattil .................. H04L 5/0007
2002/0080887 A1 6/2002 Jeong et al.
(Continued)

FOREIGN PATENT DOCUMENTS

CN 102087697 A 6/2011
CN 102438335 A 5/2012
(Continued)

OTHER PUBLICATIONS

International Search Report and Written Opinion—PCT/CN2020/092000—ISA/EPO—Feb. 19, 2021.
(Continued)

*Primary Examiner* — Dang T Ton
(74) *Attorney, Agent, or Firm* — Muncy, Geissler, Olds & Lowe, P.C.

(57) ABSTRACT

Disclosed are techniques for environment sensing by an electronic device, such as a user equipment (UE) or base station. In an aspect, the electronic device uses a radio frequency (RF) signal configured to transmit information on orthogonal frequency division multiplexing (OFDM) symbols in accordance with a wireless communication standard, such as Fifth Generation (5G) New Radio (NR), for environment sensing. The electronic device configures one or more transmission parameters for the RF signal based on one or more factors related to a resolution to be provided by the RF signal, a type of application for which the environment sensing RF signal is being transmitted, capabilities of
(Continued)

the UE, and the like. The electronic device then transmits the environment sensing RF signal, over an uplink, downlink, or sidelink, as appropriate to the type of electronic device, in accordance with the one or more transmission parameters.

28 Claims, 24 Drawing Sheets

(58) Field of Classification Search
USPC .......................................... 370/329, 400, 403
See application file for complete search history.

(56) References Cited

U.S. PATENT DOCUMENTS

| | | | |
|---|---|---|---|
| 2012/0140799 A1 | 6/2012 | Lim et al. | |
| 2013/0272347 A1 | 10/2013 | Merlin et al. | |
| 2018/0235008 A1 | 8/2018 | Park et al. | |
| 2020/0374774 A1* | 11/2020 | Han | H04W 36/0055 |
| 2020/0382992 A1* | 12/2020 | Shilov | H04W 72/56 |

FOREIGN PATENT DOCUMENTS

| | | | | |
|---|---|---|---|---|
| CN | 104168242 A | 11/2014 | | |
| CN | 109314584 A | 2/2019 | | |
| CN | 109391308 A | 2/2019 | | |
| CN | 109756251 A | 5/2019 | | |
| WO | 2007018566 A2 | 2/2007 | | |
| WO | 2016170011 A1 | 10/2016 | | |
| WO | 2017002103 A1 | 1/2017 | | |
| WO | 2018204325 A1 | 11/2018 | | |
| WO | 2019120585 A1 | 6/2019 | | |
| WO | WO-2020223731 A1 * | 11/2020 | | H04W 52/146 |

OTHER PUBLICATIONS

International Search Report and Written Opinion—PCT/CN2021/095650—ISA/EPO—Jul. 7, 2021.

Aydogdu C., et al., "Radar Interference Mitigation for Automated Driving", IEEE Signal Processing Magazine, Special Issue on Autonomous Driving, ARXIV.1909.09441v1[eess.sp], arxiv.org, Cornell University Library, 201 Olin Library Cornell University Ithaca, NY 14853, Sep. 20, 2019, pp. 1-21.

Aydogdu C., et al., "Radar Interference Mitigation for Automated Driving", IEEE Signal Processing Magazine, Special Issue on Autonomous Driving, ARXIV.1909.09441v1[eess.sp], arxiv.org, Cornell University Library, 201 Olin Library Cornell University Ithaca, NY 14853, Sep. 20, 2019, pp. 1-21, XP081479649, figures 11, 12 , p. 16, line 12—p. 19, line 1.

Keskin M.F., et al., "Stepped-Carrier OFDM V2V Resource Allocation for Sensing and Communication Convergence", 2020 14th European Conference on Antennas and Propagation (EUCAP), EURAAP, Mar. 15, 2020, XP033788698, 5 pages, abstract, figures 1-3, p. 1, left-hand column, line 16—right-hand column, line 41, p. 2, right-hand column, line 11—p. 3, right-hand column, line 9, p. 3, right-hand column, line 34—p. 5, left-hand column, line 4.

Supplementary European Search Report—EP21814342—Search Authority—Munich—May 17, 2024.

* cited by examiner

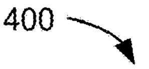
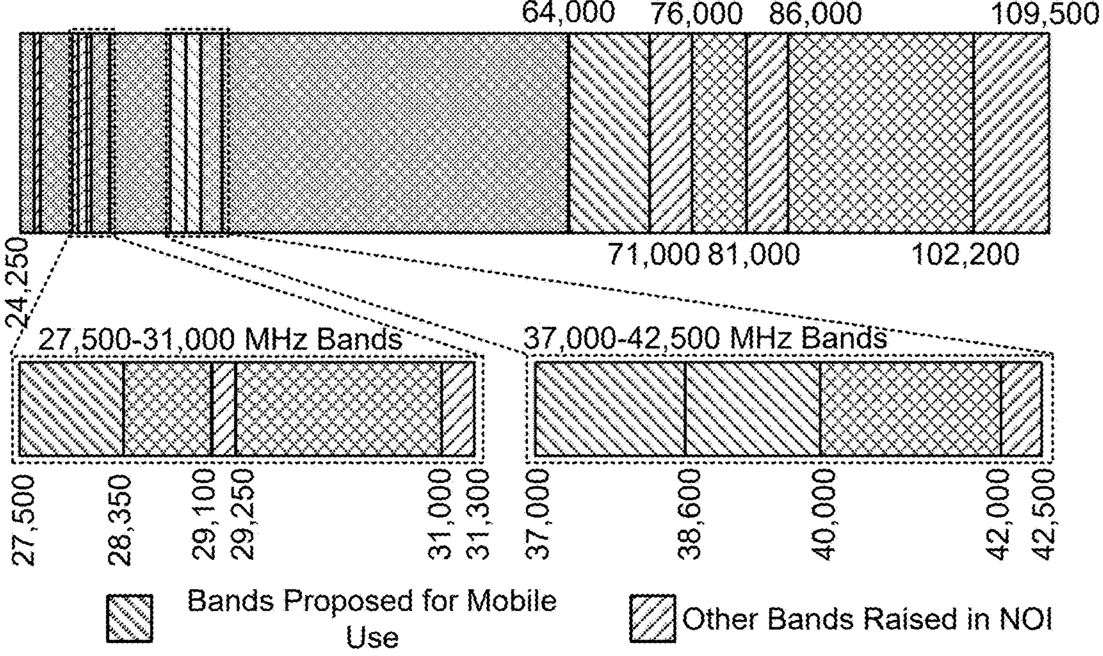
FIG. 4
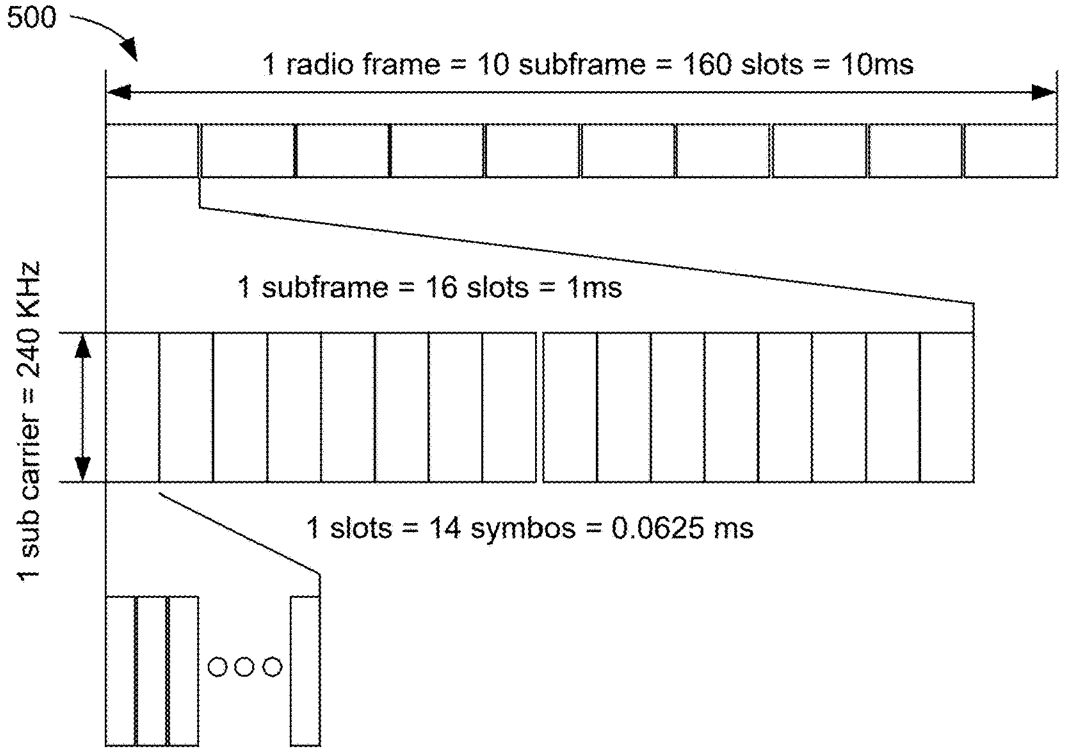
FIG. 5

Figure 11:
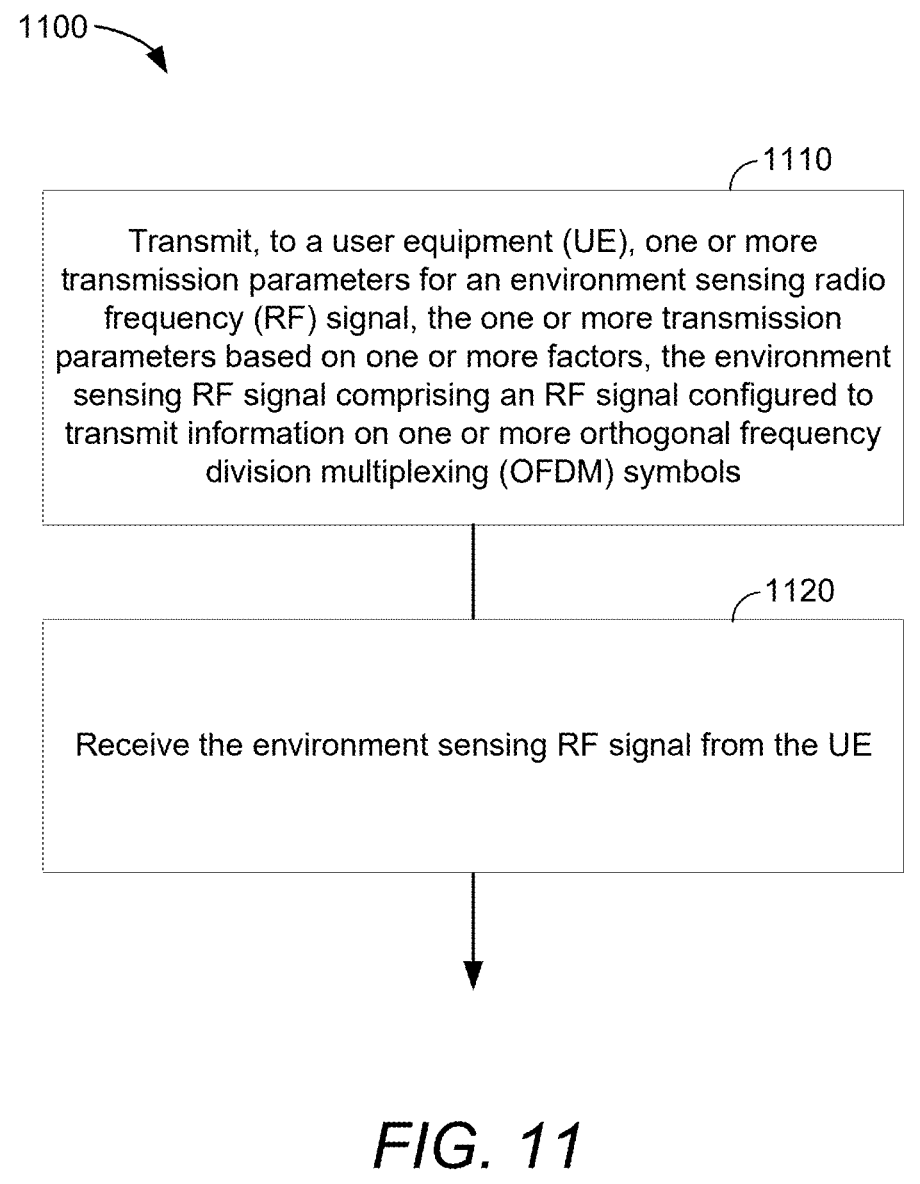

1100

1110

Transmit, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols

1120

Receive the environment sensing RF signal from the UE

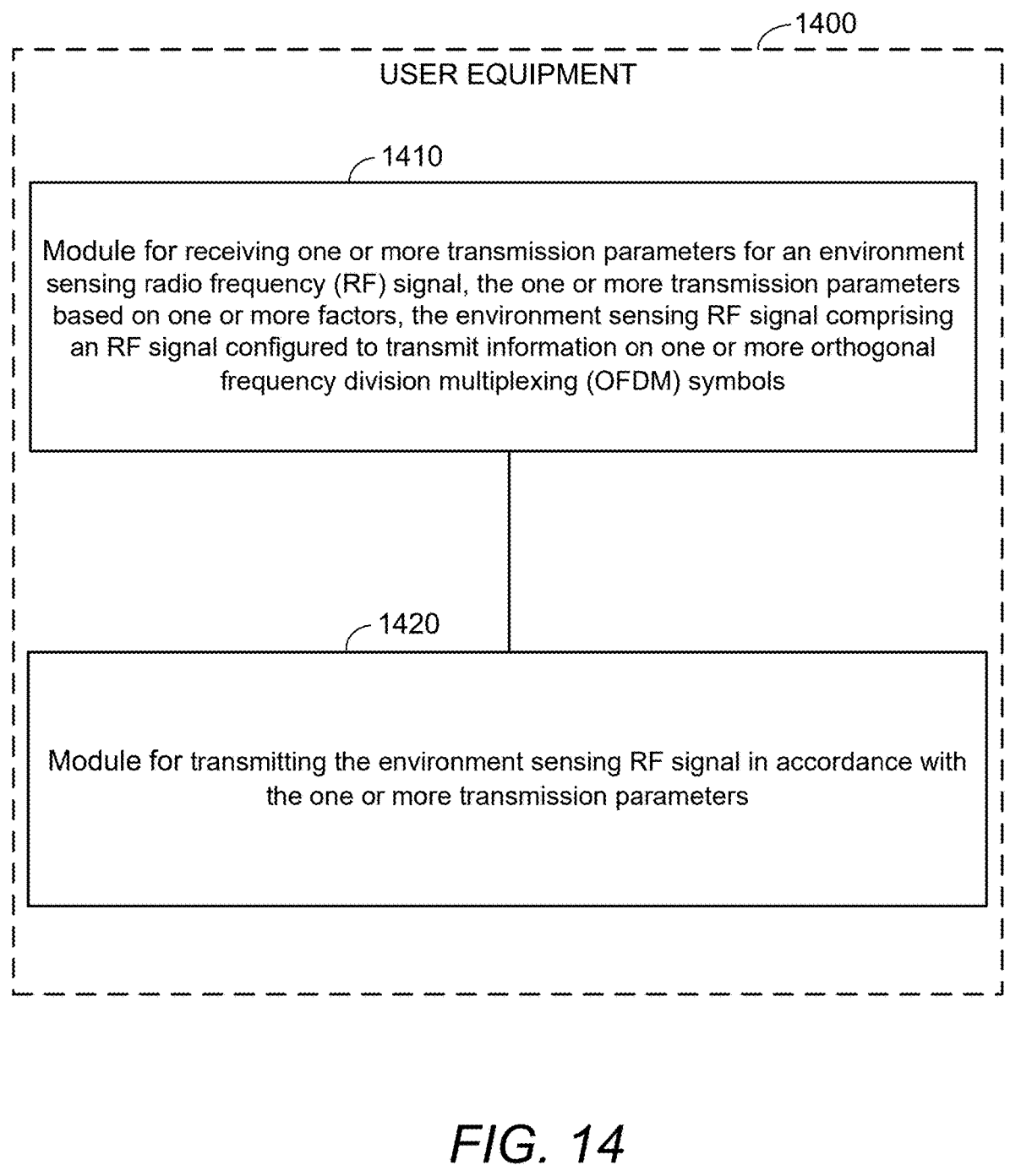

USER EQUIPMENT

1410

Module for receiving one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols

1420

Module for transmitting the environment sensing RF signal in accordance with the one or more transmission parameters

FIG. 14

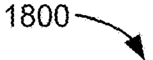
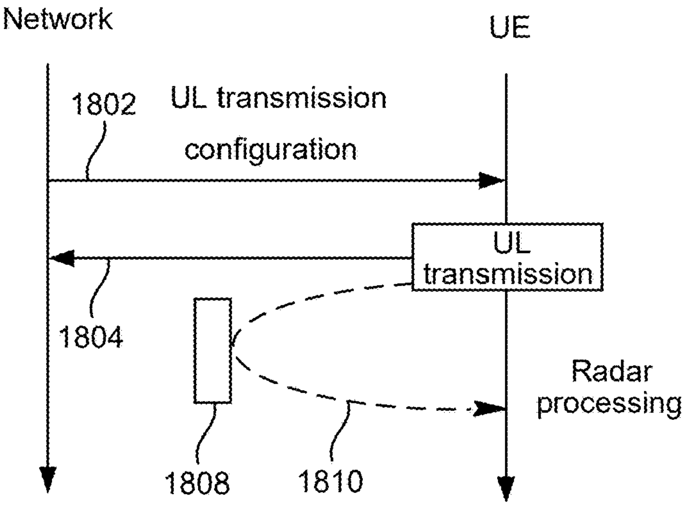
FIG. 18A
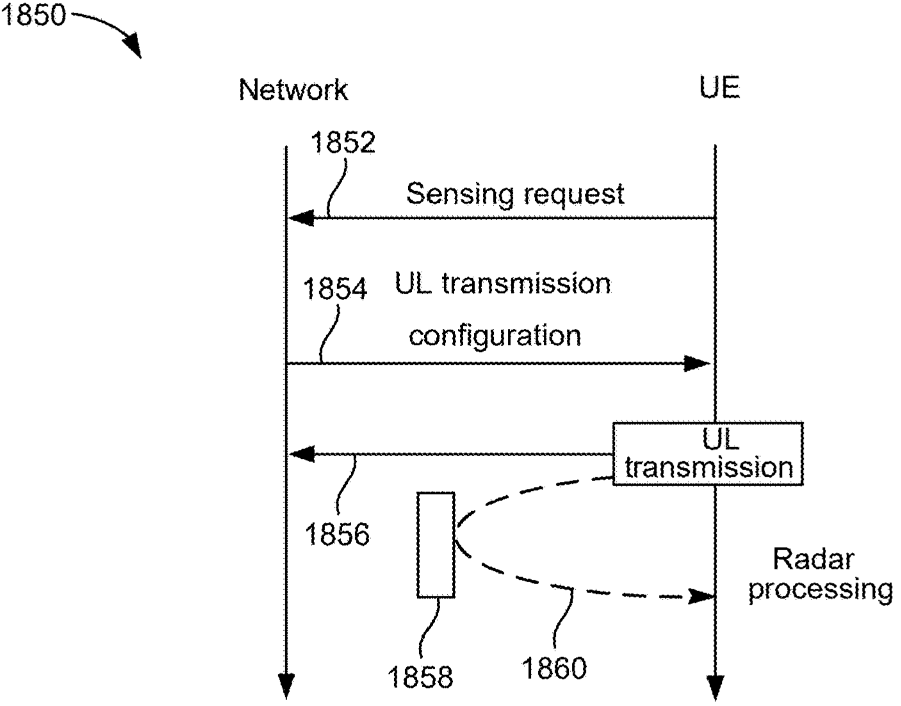
FIG. 18B

ENVIRONMENT SENSING USING RADIO FREQUENCIES

CROSS-REFERENCE TO RELATED APPLICATIONS

The present application for patent claims priority under 35 U.S.C. § 119 to International Patent Application No. PCT/CN2020/092000, entitled "ENVIRONMENT SENSING USING RADIO FREQUENCIES," filed May 25, 2020, and to International Patent Application No. PCT/CN2020/092001, entitled "ENVIRONMENT SENSING USING RADIO FREQUENCIES CONFIGURED FOR WIRELESS COMMUNICATION," filed May 25, 2020, and to International Patent Application No. PCT/CN2021/095650, entitled "ENVIRONMENT SENSING USING RADIO FREQUENCIES," filed May 25, 2021, which are assigned to the assignee hereof and expressly incorporated herein by reference in their entirety.

INTRODUCTION

Aspects of this disclosure relate generally to environment sensing. More specifically, aspects of the disclosure relate to environment sensing using wireless signals transmitted in accordance with a wireless communications standard.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of millimeter wave (mmW) radio frequency (RF) signals for wireless communication between network nodes, such as base stations, user equipments (UEs), vehicles, factory automation machinery, and the like. However, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of environment sensing performed by a user equipment (UE) includes receiving one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and transmitting the environment sensing RF signal in accordance with the one or more transmission parameters.

In an aspect, a method of environment sensing performed by a base station includes transmitting, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and receiving the environment sensing RF signal from the UE.

In an aspect, a method of environment sensing performed by an electronic device includes transmitting an environment sensing radio frequency (RF) signal carrying information on one or more orthogonal frequency division multiplexing (OFDM) symbols; and receiving a reflected RF signal, the reflected RF signal comprising a reflection of the environment sensing RF signal from an object in a path of the environment sensing RF signal.

In an aspect, a method of environment sensing performed by a user equipment (UE) includes transmitting, to a base station, an environment sensing radio frequency (RF) signal comprising a physical random-access channel (PRACH) preamble; and receiving a reflected RF signal, the reflected RF signal comprising a reflection of the environment sensing RF signal from an object in a path of the environment sensing RF signal.

In an aspect, a user equipment (UE) includes a memory; a communication device; and at least one processor coupled to the memory and the communication device, the at least one processor configured to: receive, via the communication device, one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and cause the communication device to transmit the environment sensing RF signal in accordance with the one or more transmission parameters.

In an aspect, a base station includes a memory; a communication device; and at least one processor coupled to the memory and the communication device, the at least one processor configured to: cause the communication device to transmit, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and receive, via the communication device, the environment sensing RF signal from the UE.

In an aspect, an electronic device includes a memory; a communication device; and at least one processor coupled to the memory and the communication device, the at least one processor configured to: cause the communication device to transmit an environment sensing radio frequency (RF) signal carrying information on one or more orthogonal frequency division multiplexing (OFDM) symbols; and receive, via the communication device, a reflected RF signal, the reflected RF signal comprising a reflection of the environment sensing RF signal from an object in a path of the environment sensing RF signal.

In an aspect, a user equipment (UE) includes a memory; a communication device; and at least one processor coupled to the memory and the communication device, the at least one processor configured to: cause the communication device to transmit, to a base station, an environment sensing radio frequency (RF) signal comprising a physical random-access channel (PRACH) preamble; and receive, via the communication device, a reflected RF signal, the reflected RF signal comprising a reflection of the environment sensing RF signal from an object in a path of the environment sensing RF signal.

In an aspect, a user equipment (UE) includes means for receiving one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and means for transmitting the environment sensing RF signal in accordance with the one or more transmission parameters.

In an aspect, a base station includes means for transmitting, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and means for receiving the environment sensing RF signal from the UE.

In an aspect, an electronic device includes means for transmitting an environment sensing radio frequency (RF) signal carrying information on one or more orthogonal frequency division multiplexing (OFDM) symbols; and means for receiving a reflected RF signal, the reflected RF signal comprising a reflection of the environment sensing RF signal from an object in a path of the environment sensing RF signal.

In an aspect, a user equipment (UE) includes means for transmitting, to a base station, an environment sensing radio frequency (RF) signal comprising a physical random-access channel (PRACH) preamble; and means for receiving a reflected RF signal, the reflected RF signal comprising a reflection of the environment sensing RF signal from an object in a path of the environment sensing RF signal.

In an aspect, a non-transitory computer-readable medium stores computer-executable instructions that, when executed by a user equipment (UE), cause the UE to: receive one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and transmit the environment sensing RF signal in accordance with the one or more transmission parameters.

In an aspect, a non-transitory computer-readable medium stores computer-executable instructions that, when executed by a base station, cause the base station to: transmit, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and receive the environment sensing RF signal from the UE.

In an aspect, a non-transitory computer-readable medium stores computer-executable instructions that, when executed by an electronic device, cause the electronic device to: transmit an environment sensing radio frequency (RF) signal carrying information on one or more orthogonal frequency division multiplexing (OFDM) symbols; and receive a reflected RF signal, the reflected RF signal comprising a reflection of the environment sensing RF signal from an object in a path of the environment sensing RF signal.

In an aspect, a non-transitory computer-readable medium stores computer-executable instructions that, when executed by a user equipment (UE), cause the UE to: transmit, to a base station, an environment sensing radio frequency (RF) signal comprising a physical random-access channel (PRACH) preamble; and receive a reflected RF signal, the reflected RF signal comprising a reflection of the environment sensing RF signal from an object in a path of the environment sensing RF signal.

In an aspect, a method of environment sensing performed by an electronic device includes configuring one or more parameters for an environment sensing radio frequency (RF) signal based on one or more factors, the environment sensing RF signal comprising an RF signal configured to transmit information on orthogonal frequency division multiplexing (OFDM) symbols, and transmitting the environment sensing RF signal in accordance with the one or more parameters.

In an aspect, an electronic device includes a memory and at least one processor coupled to the memory, the memory and the at least one processor configured to: configure one or more transmission parameters for an environment sensing RF signal based on one or more factors, the environment sensing RF signal comprising an RF signal configured to transmit information on OFDM symbols, and transmit the environment sensing RF signal in accordance with the one or more transmission parameters.

In an aspect, an electronic device includes means for configuring one or more transmission parameters for an environment sensing RF signal based on one or more factors, the environment sensing RF signal comprising an RF signal configured to transmit information on OFDM symbols, and means for transmitting the environment sensing RF signal in accordance with the one or more transmission parameters.

In an aspect, a non-transitory computer-readable medium storing computer-executable instructions includes computer-executable instructions comprising at least one instruction instructing an electronic device to configure one or more transmission parameters for an environment sensing RF signal based on one or more factors, the environment sensing RF signal comprising an RF signal configured to transmit information on OFDM symbols, and at least one instruction instructing the electronic device to transmit the environment sensing RF signal in accordance with the one or more transmission parameters.

In an aspect, a method of environment sensing performed by an electronic device includes transmitting an environment sensing RF signal on one or more time and/or frequency resources, the environment sensing RF signal configured on the one or more time and/or frequency resources according to a wireless communications standard, and receiving a reflected RF signal, the reflected RF signal comprising a reflection of the environment sensing RF signal from an object in a path of the environment sensing RF signal.

In an aspect, an electronic device includes a memory and at least one processor coupled to the memory, the memory and the at least one processor configured to: transmit an environment sensing RF signal on one or more time and/or frequency resources, the environment sensing RF signal configured on the one or more time and/or frequency resources according to a wireless communications standard, and receive a reflected RF signal, the reflected RF signal comprising a reflection of the environment sensing RF signal from an object in a path of the environment sensing RF signal.

In an aspect, an electronic device includes means for transmitting an environment sensing RF signal on one or more time and/or frequency resources, the environment sensing RF signal configured on the one or more time and/or frequency resources according to a wireless communications standard, and means for receiving a reflected RF signal, the reflected RF signal comprising a reflection of the environment sensing RF signal from an object in a path of the environment sensing RF signal.

In an aspect, a non-transitory computer-readable medium storing computer-executable instructions includes computer-executable instructions comprising at least one instruction instructing an electronic device to transmit an environment sensing radio frequency (RF) signal on one or more time and/or frequency resources, the environment sensing RF signal configured on the one or more time and/or frequency resources according to a wireless communications standard, and at least one instruction instructing the electronic device to receive a reflected RF signal, the reflected RF signal comprising a reflection of the environment sensing RF signal from an object in a path of the environment sensing RF signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 2A illustrates the general process of transmitting and collecting millimeter wave (mmW) radio frequency (RF) signal data, according to aspects of the disclosure.

FIG. 2B is a graph illustrating an example waveform of transmitted and received frequency modulated continuous wave (FMCW) RF signals, according to aspects of the disclosure.

FIG. 4 is a diagram of various frequency bands above 24 gigahertz (GHz) that may be used for wireless mobile communications.

FIG. 5 is a diagram illustrating an example of a radio frame structure, according to aspects of the disclosure.

FIGS. 10A, 10B, and 11 illustrate example methods for environment sensing, according to aspects of the disclosure.

FIGS. 12 to 15 are simplified block diagrams of various apparatuses configured to support environment sensing operations as taught herein.

FIG. 18A illustrates an example method for configuring a user equipment (UE) for uplink transmission according to a first mode disclosed herein.

FIG. 18B illustrates an example method for configuring a UE for uplink transmission according to a second mode disclosed herein.

DETAILED DESCRIPTION

Figure 1:
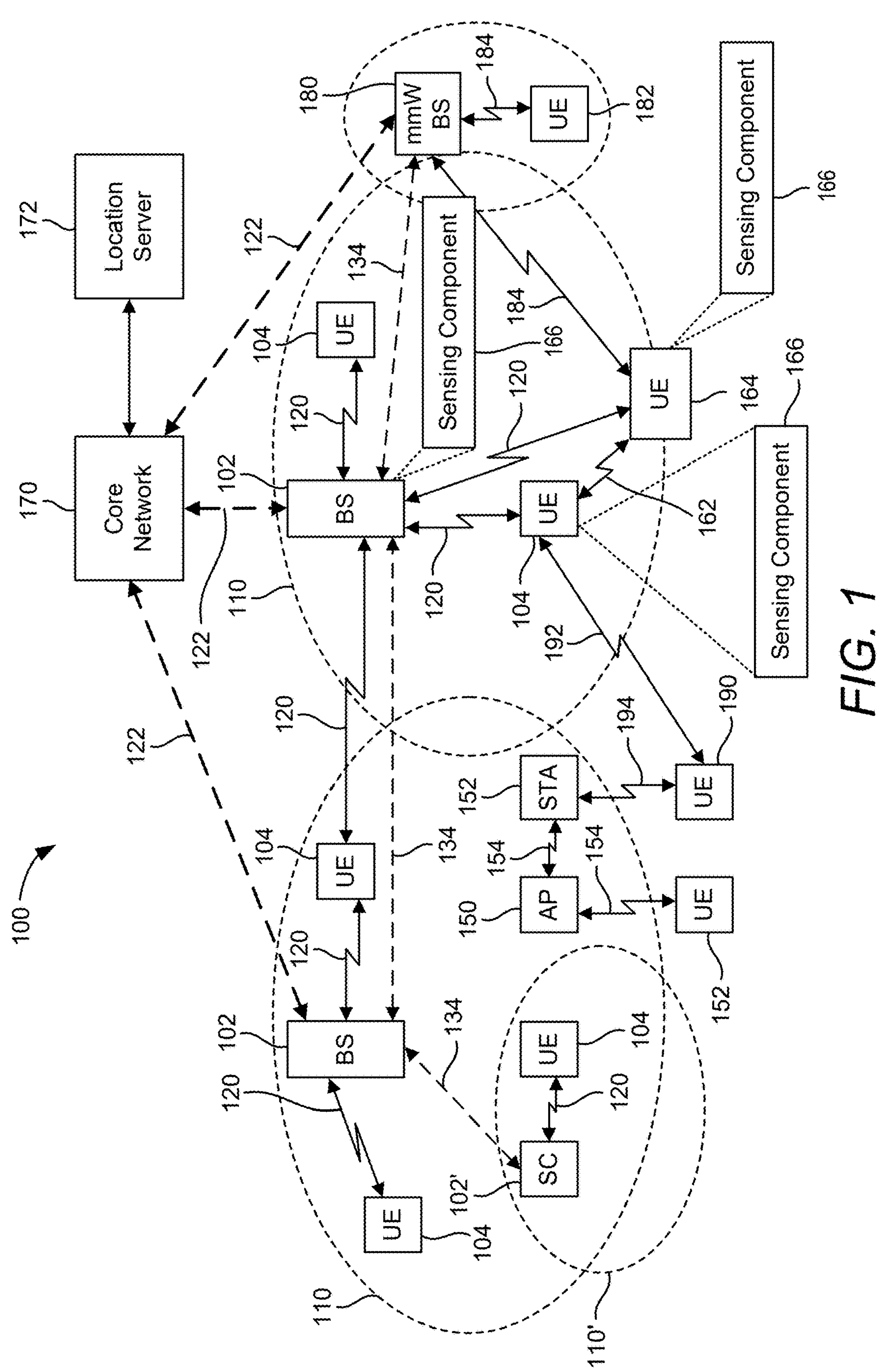
FIG. 1 illustrates an example wireless communications system, according to aspects of the disclosure.

In an aspect, an electronic device, such as a user equipment (UE) or a base station, uses a radio frequency (RF) signal to transmit information on orthogonal frequency division multiplexing (OFDM) symbols in accordance with a wireless communication standard, such as Fifth Generation (5G) New Radio (NR), for environment sensing. That is, RF signals being used for communication in accordance with a wireless communication standard may be reused as an environment sensing signal. According to one example, the electronic device applies one or more transmission parameters to the RF signal based on one or more factors related to a resolution to be provided by the RF signal, a type of application for which the environment sensing RF signal is being transmitted, capabilities of the UE, and the like. According to one example, the transmission parameters may include the power control for the sensing waveform, the bandwidth configuration (i.e., a particular bandwidth value or set of bandwidth values) for the sensing waveform, the time duration configuration for the sensing waveform (i.e., a particular time duration value or set of time duration values), and/or the antenna configuration for the sensing waveform (i.e., a particular arrangement (e.g., number of antenna elements) or set of arrangements of the antenna(s) of the electronic device). The electronic device may receive the one or more transmission parameters from a base station or determine them itself. The electronic device then transmits the environment sensing RF signal, over an uplink, downlink, or sidelink, as appropriate to the type of electronic device, in accordance with the one or more transmission parameters.

In an aspect, an electronic device transmits an environment sensing RF signal, over an uplink, downlink, or sidelink, as appropriate to the type of electronic device, on one or more time and/or frequency resources (e.g., OFDM symbols, resource blocks, slots, subframes, etc.). The environment sensing RF signal is transmitted on the one or more time and/or frequency resources according to a wireless communications standard (e.g., 5G NR). The electronic device monitors for and may receive a reflected RF signal that is a reflection of the environment sensing RF signal from an object (e.g., a human, a vehicle, a reconfigurable intelligent surface (RIS), etc.) in a path of the environment sensing RF signal. In an aspect, where the electronic device is a UE, the UE can use the existing uplink OFDM waveform as the environment sensing RF signal. In another aspect, where the environment sensing device is a UE, the UE can leverage the physical random-access channel (PRACH) as the environment sensing RF signal. In yet another aspect, an indication of the UE's environment sensing capability may be added to the capability report the UE sends to the network. In yet another aspect, the UE's serving base station may indicate the sensing waveform pattern to the UE.

Using the disclosed techniques, wireless communication signals can be reused for environment sensing.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. The UE 164 may also communicate directly with one or more other UEs 104 over a wireless sidelink 162. A wireless sidelink (or just "sidelink") is an adaptation of the core cellular (e.g., LTE, NR) standard that allows direct communication between two or more UEs without the communication needing to go through a base station. The sidelink 162 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc.

In an aspect, the UE 164 may include a sensing component 166 that may enable the UE 164 to perform the UE environment sensing operations described herein. Similarly, the base stations 102 may include a sensing component 166 that may enable the base stations 102 to perform the base station environment sensing operations described herein. Note that although only UE 164, one UE 104, and one base station 102 in FIG. 1 are illustrated as including a sensing component 166, any of the UEs and base stations in FIG. 1 may include a sensing component 166.

The wireless communications system 100 may further include one or more UEs, such as UE 190, that connects indirectly to one or more communication networks via one or more D2D peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Cellular communication can use RF signals at mmW frequencies for wireless communication between network nodes, such as base stations, UEs, vehicles, factory automation machinery, and the like. However, mmW RF signals can be used for other purposes as well, such as weapons systems (e.g., as short-range fire-control radar in tanks and aircraft), security screening systems (e.g., in scanners that detect weapons and other dangerous objects carried under clothing), medicine (e.g., to treat disease by changing cell growth), and the like. In addition, mmW RF signals can be used for environmental sensing, such as object detection and motion sensing.

RF signals at mmW frequencies can provide high bandwidth and a large aperture to extract accurate range, Doppler, and angle information for environment sensing. Using mmW RF signals for environment sensing can provide such features in a compact form factor, such as a small sensing component that can conveniently fit into a handheld device. Such a sensing component (e.g., chip) may be a digital signal processor (DSP), system-on-chip (SoC), or other processing component that can be integrated into another device (a host device), such as a UE, a base station, an IoT device, a factory automation machine, or the like. In an aspect, a sensing component may be, or may be incorporated into, a modem for wireless communication, such as a 5G modem, a 60 GHz WLAN modem, or the like. A device containing a sensing component may be referred to as a host device, an environment sensing device, a sensing device, and the like.

Figure 2A:
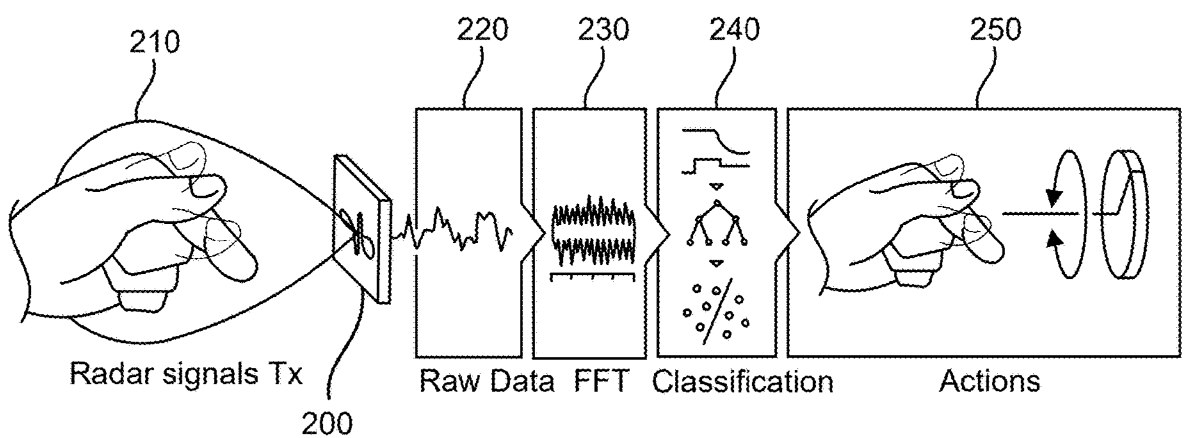
FIGS. 2A and 2B illustrate example wireless network structures, according to aspects of the disclosure.

FIG. 2A illustrates the general process of transmitting and collecting mmW RF signal data, according to aspects of the disclosure. In the example of FIG. 2A, at stage 210, a sensing component 200 (which may correspond to sensing component 166 in FIG. 1) transmits mmW RF signals with a predefined waveform, such as a frequency modulated continuous wave (FMCW). In FMCW techniques, an RF signal with a known stable frequency continuous wave (i.e., an RF signal with constant amplitude and frequency) varies up and down in frequency over a fixed period of time according to a modulating signal. The mmW RF signals may be transmitted in a beam (e.g., using beamforming) and may reflect off of nearby objects, such as a human face or hand, within the beam. A portion of the transmitted RF signals is reflected back towards the sensing component 200. At stage 220, the sensing component 200 receives/detects the RF return data (i.e., the reflections of the transmitted mmW RF signals).

At stage 230, the sensing component 200 performs a fast Fourier transform (FFT) on the raw RF return data. An FFT converts an RF signal from its original domain (here, time) to a representation in the frequency domain, and vice versa. Frequency differences between the received RF signal and the transmitted RF signal increase with delay (i.e., the time between transmission and reception), and hence, with distance (range). The sensing component 200 correlates reflected RF signals with transmitted RF signals to obtain range, Doppler, and angle information associated with the target object. The range is the distance to the object, the Doppler is the speed of the object, and the angle is the horizontal and/or vertical distance between the detected object and a reference RF ray emitted by the sensing component 200, such as the initial RF ray of a beam sweep.

From the determined properties of the reflected RF signals, the sensing component 200 can determine information about the detected object's characteristics and behaviors, including the size, shape, orientation, material, distance, and velocity of the object. At stage 240, the sensing component 200 classifies the detected object and/or motion of the detected object based on the determined characteristics. For example, the sensing component 200 can use machine learning to classify the detected object as a hand and the motion of the detected object as a twisting motion. At stage 250, based on the classification at stage 240, the sensing component 200 can cause the host device to perform an action, such as turning a virtual dial on the screen of the host device as in the example of FIG. 2.

Figure 2B:
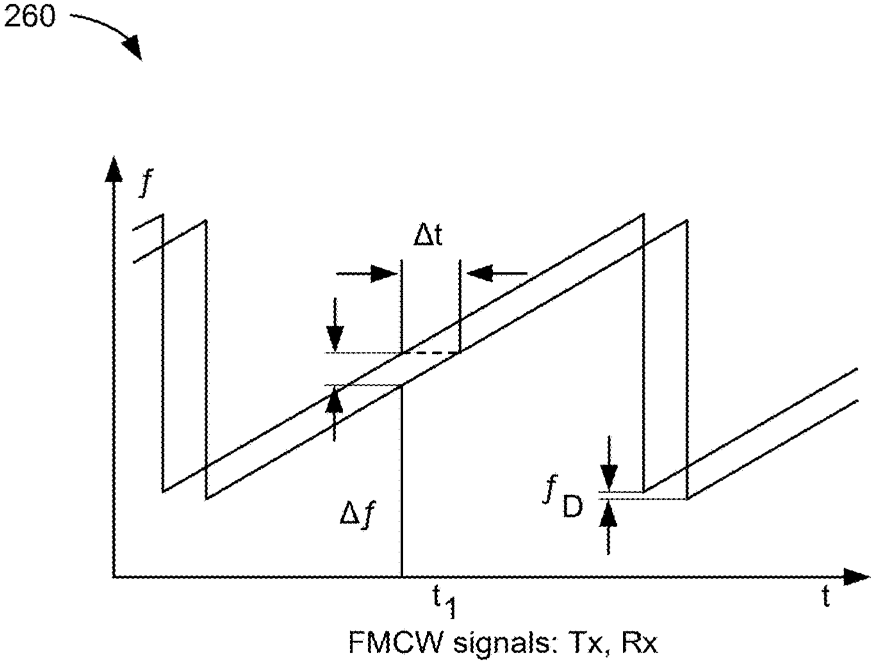

FIG. 2B is a graph 260 illustrating an example waveform of a transmitted and received FMCW RF signals, according to aspects of the disclosure. FIG. 2B illustrates an example of a sawtooth modulation, which is a common FMCW waveform where range is desired. Range information is mixed with the Doppler velocity using this technique. Modulation can be turned off on alternate scans to identify velocity using unmodulated carrier frequency shift. This allows range and velocity to be determined with one radar set.

As shown in FIG. 2B, the received RF waveform (the lower diagonal lines) is simply a delayed replica of the transmitted RF waveform (the upper diagonal lines). The frequency at which the waveforms are transmitted is used to down-convert the received RF waveform to baseband (a signal that has a near-zero frequency range), and the amount of frequency shift between the transmitted RF waveform and the reflected (received) RF waveform increases with the time delay between them. The time delay is thus a measure of range to the target object. For example, a small frequency spread is produced by reflections from a nearby object, whereas a larger frequency spread is produced by reflections from a further object, thereby resulting in a longer time delay between the transmitted and received RF waveforms.

Figure 3:
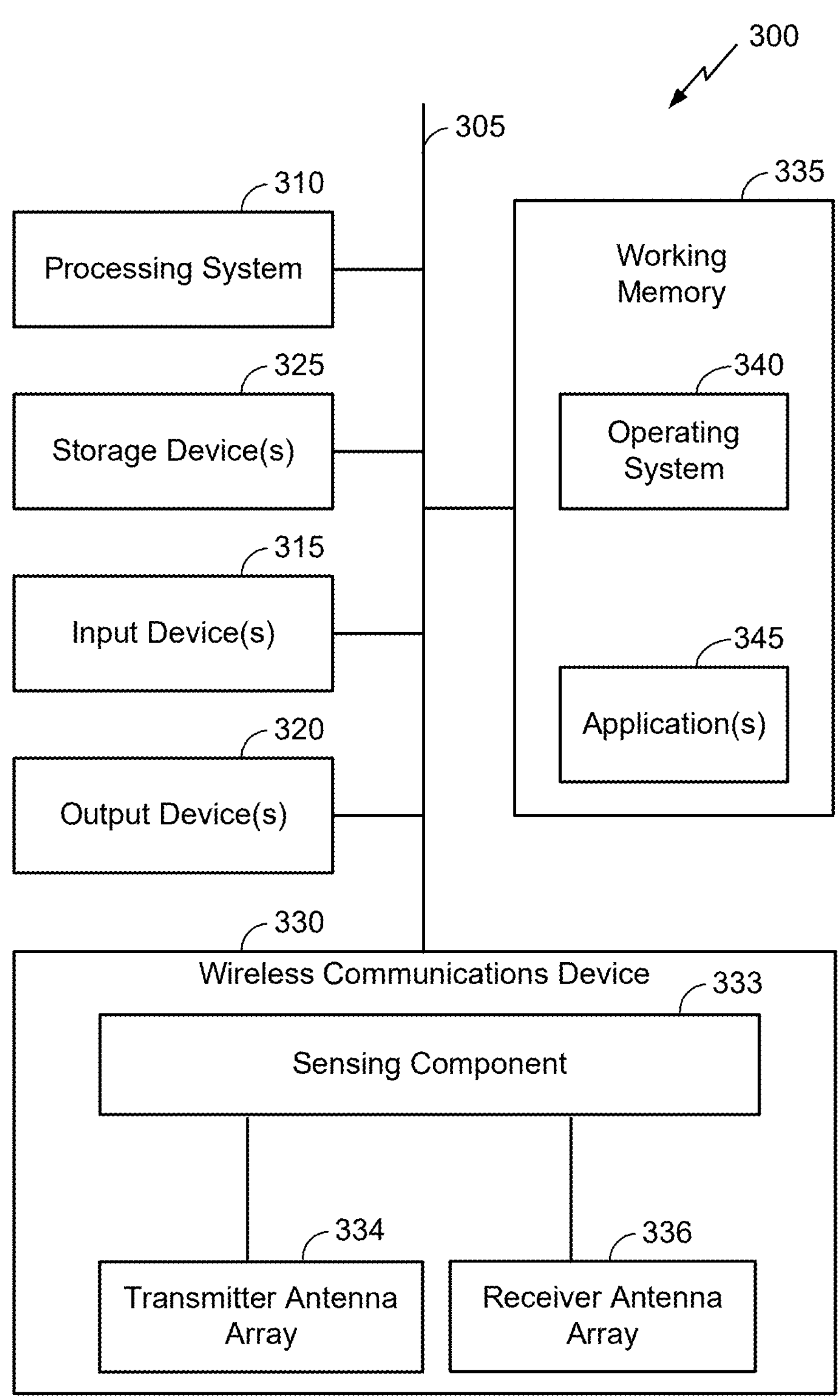
FIG. 3 illustrates an example electronic device configured as an environment sensing device, according to aspects of the disclosure

FIG. 3 illustrates an example electronic device 300 configured as an environment sensing device (i.e., having components and functionality capable of performing environment sensing as described herein), according to aspects of the disclosure, which may incorporate a sensing component as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner. In addition, it can be noted that components illustrated by FIG. 3 can be localized to a single device and/or distributed among various networked devices, which may be disposed at different physical or geographical locations. The electronic device 300 may be, or be incorporated into, any of a variety of devices, including a WLAN AP (e.g., WLAN AP 150 in FIG. 1), a cellular base station (e.g., base station 102, small cell base station 102', mmW base station 180 in FIG. 1), or a UE, such as a "smart" speaker (e.g., an Amazon Echo, Google Home, Apple HomePod, etc.) or other IoT device, a mobile phone, tablet computer, a personal computer (PC), a laptop computer, a security device (e.g., camera, floodlight, etc.), a factory automation machine, and/or the like.

The electronic device 300 is shown comprising hardware elements that can be electrically (communicatively) coupled via a bus 305 (or may otherwise be in communication, as appropriate). The hardware elements may include a processing system 310, which can include without limitation one or more general-purpose processors, one or more special-purpose processors (such as a DSP, ASIC, field programmable gate array (FPGA), and/or the like), one or more processing cores, and/or other processing structures, which can be configured to perform the functionality described herein. The electronic device 300 also can include one or more input devices 315, which can include without limitation a touch-screen, a mouse, a keyboard, a camera, a microphone, and/or the like; and one or more output devices 320, which can include without limitation a display device (e.g., a touch-screen, one or more light-emitting diodes (LEDs), a printer, and/or the like.

The electronic device 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The electronic device 300 may also include a wireless communications device 330 that can include support for one or more wireless communication technologies (e.g., 5G, IEEE 802.11ad). The wireless communications device 330 may comprise a modem, a transceiver, a transmit/receive processor, and/or the like, corresponding to or including a sensing component 333, such as the sensing component 166 in FIG. 1 or the sensing component 200 in FIG. 2A. The wireless communications device 330 may include one or more input and/or output communication interfaces to permit data and signaling to be exchanged with a wireless network (e.g., a 5G network) or other wireless devices within the wireless network. In an aspect, the sensing component 333 may include or be coupled to a transmitter antenna array 334 and a receiver antenna array 336, and the circuitry connected with the transmitter antenna array 334 and the receiver antenna array 336 may be used for both the environment sensing techniques described herein and wireless data communication. For example, in some aspects, the wireless communications device 330 may comprise a 5G modem capable of both the environment sensing techniques described herein and wireless data communication.

The wireless communications device 330 may comprise an integrated communications device (e.g., embodied as a transmitter circuit and a receiver circuit of a single communication device) in some implementations, and in others, may comprise a separate transmitter device and a separate receiver device, or may be embodied in other ways in other implementations. In an aspect, a transmitter may include a plurality of antennas, such as transmitter antenna array 334, that permits the electronic device 300 to perform transmit "beamforming," as described further herein. Similarly, a receiver may include a plurality of antennas, such as receiver antenna array 336, that permits the electronic device 300 to perform receive beamforming, as described herein.

The electronic device 300 may further comprise a working memory 335, which can include a RAM and/or or ROM device. Software elements, shown as being located within the working memory 335, can include an operating system 340, device drivers, executable libraries, and/or other code, such as application(s) 345, which may comprise computer programs provided by various aspects, and/or may be designed to implement methods, and/or configure systems, provided by other aspects, as described herein. Merely by way of example, one or more procedures described with respect to the method(s) discussed below may be implemented as code and/or instructions that are stored (e.g., temporarily) in working memory 335 and are executable by a computer (and/or a processing unit within a computer, such as processing system 310); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 325 described above. In some cases, the storage medium might be incorporated within a computer system, such as electronic device 300. In other aspects, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 300 and/or might take the form of source and/or installable code, which, upon compilation and/or installation on the electronic device 300 (e.g., using any of a variety of generally available compilers, installation programs, compression/decompression utilities, etc.), then takes the form of executable code.

Spectrum in the 30 GHz to 300 GHz frequency bands has been used in 5G NR and 802.11ad networks (e.g., 60 GHz communication networks) for wireless data communication. Larger bandwidth (e.g., greater than or equal to 2 GHz) can enable data rates of multigigabits per second. FIG. 4 is a diagram 400 of various frequency bands above 24 GHz that may be used for wireless mobile communications. As shown in FIG. 4, there are bands at, around, or between 24,250, 27,500, 28,350, 29,100, 29,250, 31,000, 31,300, 37,000, 38,600, 40,000, 42,000, 42,500, 64,000, 71,000, 76,000, 81,000, 86,000, 102,200, and 109,500 MHz. Of particular interest for NR 5G operation are the frequency bands from 27,500 MHz to 31,000 MHz and 37,000 MHz to 42,500 MHz.

Various frame structures may be used to support downlink and uplink transmissions between network nodes (e.g., base stations and UEs). FIG. 5 is a diagram 500 illustrating an example of a radio frame structure, according to aspects of the disclosure. Other wireless communications technologies may have different frame structures and/or different channels.

5G NR utilizes orthogonal frequency division multiplexing (OFDM) on the downlink and single-carrier frequency division multiplexing (SC-FDM) or OFDM on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, 5G NR may support multiple numerologies (u), for example, subcarrier spacing (SCS) of 15 kHz, 30 kHz, 60 kHz, 120 kHz, and 240 kHz or greater may be available. Table 1 provided below lists some various parameters for different NR numerologies. As shown in Table 2, the slot length becomes shorter as the SCS becomes wider. For example, for 240 kHz SCS in 28 GHz, there are only 250 microseconds (μs) per slot, and the short slot reduces latency.

TABLE 1

| μ | SCS (kHz) | Symbols/ Sot | Slots/ Sub- frame | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

FIG. 5 illustrates a frame structure for a numerology of 240 kHz. In FIG. 5, time is represented horizontally (e.g., on the X axis) with time increasing from left to right. In the time domain, a radio frame (e.g., 10 ms) is divided into 10 equally sized subframes of 1 millisecond (ms) each, and each subframe is divided into 16 time slots of 0.0625 ms each. Each slot is divided into 14 symbols of 4.17 μs each. One slot in the time domain and 12 contiguous subcarriers in the frequency domain is referred to as a resource block (RB). RBs are further divided into multiple resource elements (REs). An RE corresponds to one symbol length in the time domain and one subcarrier in the frequency domain.

Beamforming at mmW frequencies would be beneficial in a number of scenarios, including industrial IoT, AR/VR, autonomous driving, gaming, and the like. Each of these scenarios needs large data throughput, accurate beam alignment, fine granularity localization, and ultra-low latency. However, there are various issues that can arise. For example, beam alignment for mobility (i.e., UEs in motion) largely reduces the spectral efficiency and involves additional latency. As another example, for positioning purposes, there is still a gap between current capabilities and the desire to meet the centimeter-level granularity desired for industrial applications. Environmental sensing using 5G mmW RF signals can address these issues.

Figure 6:
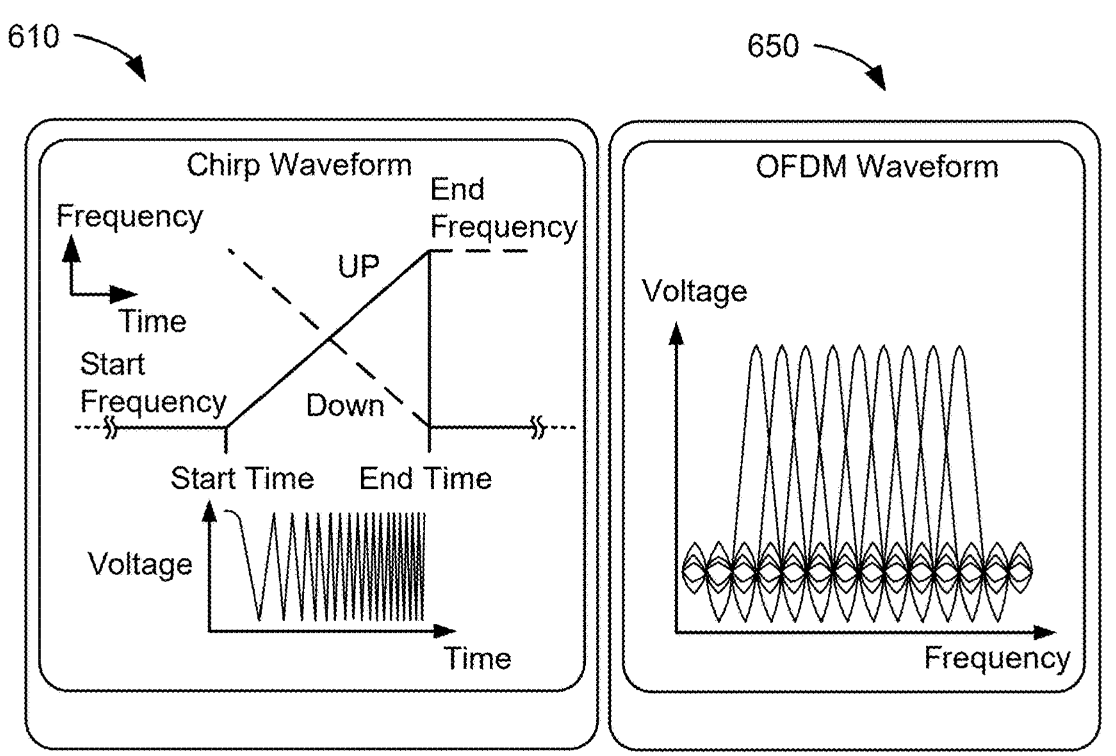
FIG. 6 illustrates a comparison between a simple chirp waveform and a mmW orthogonal frequency division multiplexing (OFDM) waveform, according to aspects of the disclosure.

For environment sensing in 5G mmW frequency bands, a wideband signal using multiple-input multiple-output (MIMO) would be desirable. MIMO is a technique for multiplying the capacity of a radio link using multiple transmission and receiving antennas to exploit multipath propagation. A simple chirp waveform could be used if the only purpose of the transmitted RF signal were for environmental sensing. However, due to the short wavelength, a more complex OFDM waveform in a 5G mmW frequency band can be used for both communication (e.g., over a 5G network) and environment sensing. FIG. 6 illustrates a comparison between a simple chirp waveform and a more complex mmW OFDM waveform, according to aspects of the disclosure. Specifically, FIG. 6 illustrates a diagram 610 of an example chirp waveform and a diagram 650 of an example mmW OFDM waveform.

Figure 7:
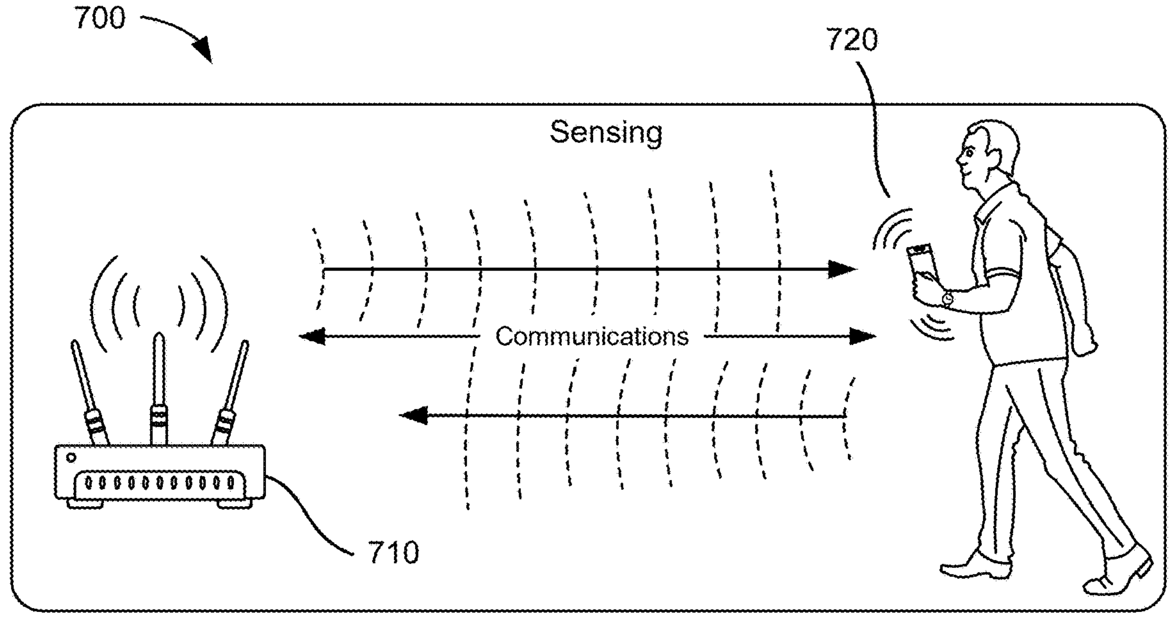
FIG. 7 is a diagram of an example scenario in which a UE of a user is within communication range of an access point, according to aspects of the disclosure.

When using an OFDM waveform for environment sensing, both the downlink and uplink waveform can be used for sensing operations. FIG. 7 is a diagram 700 of an example scenario in which a UE 720 of a user is within communication range of an AP 710 (or other type of base station), according to aspects of the disclosure. The AP 710 and the UE 720 may communicate over a wireless communication link configured in accordance with, for example, 5G NR or IEEE 802.11ad. In addition, in the downlink, the AP 710 can use environment sensing to detect the user's presence, motion, and actions for, for example, improved communication link establishment (e.g., what direction to form a transmit beam for the communication link). In the uplink, the UE 720 can use environment sensing to provide awareness of interactions with the user and/or the AP 710 (e.g., proximity) and/or to determine other personal information.

According to one or more examples, using mmW RF signal-based environment sensing provides non-vision-based low-power always-on context awareness, meaning the environment sensing device can sense objects and/or actions in any lighting conditions, and even when the object is blocked from view of the environment sensing device. mmW RF signal-based environment sensing also provides touchless interaction, enabling a user to interact with an environment sensing device without touching a user interface (e.g., touchscreen, keyboard, etc.) of the sensing device. Applications of environment sensing include imaging the environment, such as creating a three-dimensional (3D) map of the environment for VR use cases, high resolution localization for, for example, industrial IoT use cases, assisting communication by, for example, providing more accurate beam tracking, and machine learning, for example, providing an effective interface between the human user and the machine.

Figure 8:
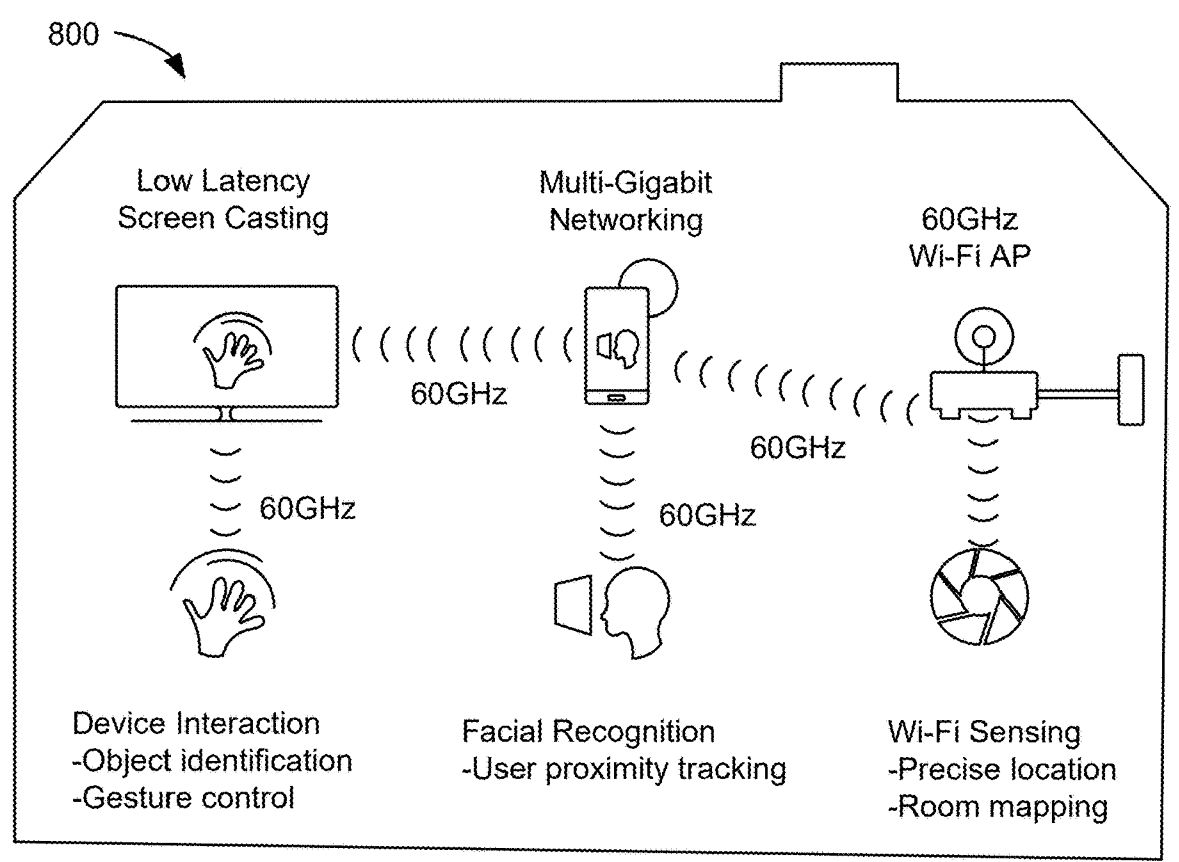
FIG. 8 is a diagram of various uplink and downlink environment sensing scenarios using mmW RF signals, according to aspects of the disclosure.

FIG. 8 is a diagram 800 of various uplink and downlink environment sensing scenarios using 5G mmW RF signals, according to aspects of the disclosure. As an example downlink-based sensing scenario, a WiFi® AP operating in accordance with 5G can configure downlink mmW RF signals for environment sensing and use them to perform imaging of the local environment to localize the users playing a VR game. At the same time, and potentially using the same downlink 5G mmW RF signals, the WiFi® AP can communicate with the UEs of the gamers for data transmission. As an example uplink-based sensing scenario, a UE can transmit an uplink 5G mmW RF signal to communicate with the WiFi® AP, and at the same time, use the RF signal for facial or motion (e.g., hand motion) interaction with the user.

Figure 9:
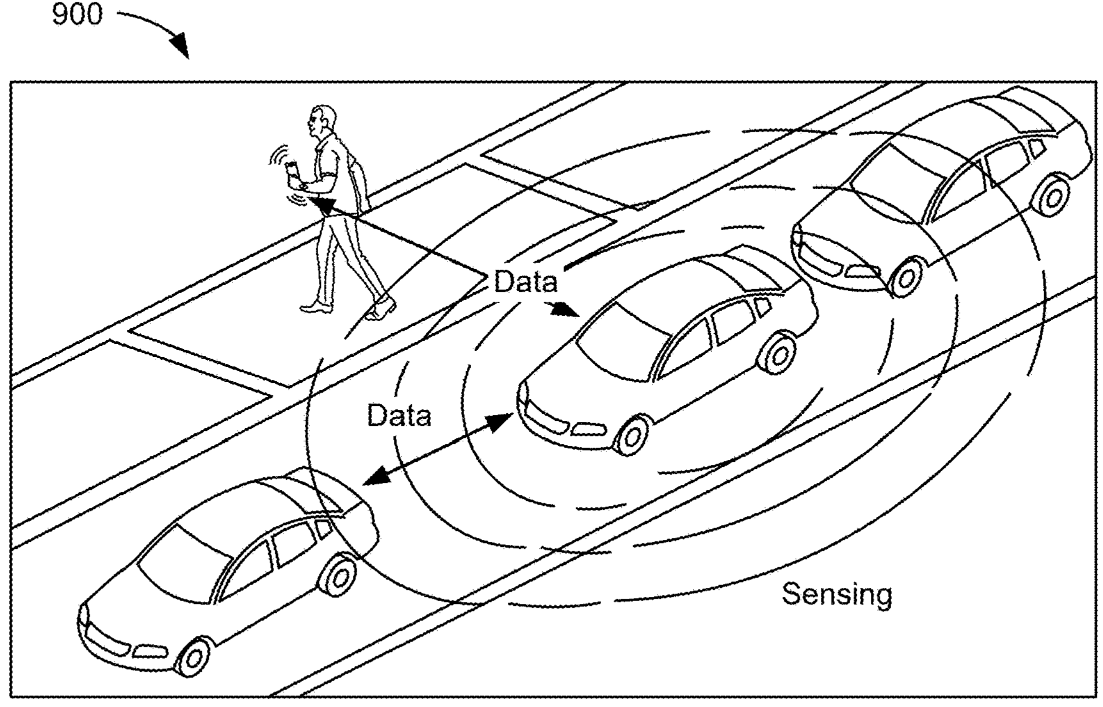
FIG. 9 is a diagram of a vehicle-to-vehicle (V2V)/vehicle-to-everything (V2X) environment sensing scenario using mmW RF signals, according to aspects of the disclosure.

FIG. 9 is a diagram 900 of a V2V/V2X environment sensing scenario using 5G mmW RF signals, according to aspects of the disclosure. In the example of FIG. 9, multiple vehicles, referred to as "vehicle UEs" or "V-UEs," and a pedestrian UE (P-UE) may communicate with each other over sidelink communication links, which are a type of P2P/D2D communication link that operates in accordance with the 5G communications standard. In a sidelink sensing scenario, a V-UE and/or P-UE transmits 5G mmW RF signals to provide information to nearby UEs, and in addition, to measure the range to, and possibly relative location of, adjacent objects (e.g., other V-UEs, roadside access points, P-UEs, etc.).

The present disclosure provides techniques to combine 5G communications at mmW frequencies with environment sensing, thereby providing improved communication (e.g., by decreasing the amount of time needed for beam alignment) and additional dimensionality for radar applications. In order to use 5G mmW RF signals being used for communication for environment sensing, the environment sensing device needs to determine how to combine the sensing waveform (i.e., the 5G mmW RF signals being used for environment sensing) with the NR OFDM waveform (i.e., the mmW RF signals being used to communicate in accordance with the 5G standard). The environment sensing device also needs to determine how to transmit the sensing waveform.

Parameters affecting these determinations include the power control for the sensing waveform, the bandwidth configuration for the sensing waveform, the time duration configuration for the sensing waveform, and/or the antenna configuration for the sensing waveform.

The power control for the sensing waveform may be based on one or more factors. One factor may be related to the sensing granularity. For example, if the environment sensing device is only sensing within a short range (e.g., 1 meter or less), the sensing device may configure (e.g., set) the effective transmit power for the sensing waveform such that it only propagates over the given range.

Another factor may be related to interference management. For example, for two environment sensing devices that are within a threshold distance of each other, the transmit power of the sensing waveform should be low enough to avoid interference with the nearby environment sensing device. Where the environment sensing device is a UE, the uplink transmit power should not be increased or decreased such that it negatively effects uplink reception at the base station or access point. Likewise, where the environment sensing device is a base station, the downlink transmit power should not be increased or decreased such that it negatively effects reception at the UE.

Another factor may be related to the application scenario. For example, for an industrial IoT scenario, which requires centimeter resolution for positioning purposes, the transmit power should be configured (e.g., set) so as to avoid causing interference to the IoT device(s) adjacent the IoT device being sensed. As another example, for an indoor VR scenario, which needs sensing to be available in the whole room in which the VR system is located, the transmit power should be set high enough to provide sensing throughout the entire room.

Another factor for controlling the power of the sensing waveform may be related to the uplink transmission power. For example, a base station could may indicate the uplink transmit power level permitted for environment sensing, as it does the uplink transmission power for communication.

The bandwidth selected for the sensing waveform may also be based on one or more factors. One factor may be related to the resolution of the sensing range. For example, range resolution is given by $c/2B$, where c is the speed of light and B is the utilized bandwidth. A larger value of B would lead to a higher resolution but with higher resource and computation cost.

Another factor may be related to the application scenario. For example, for an industrial IoT scenario, tracking the movement of a robotic arm may require centimeter or even millimeter resolution, and thus, the selected bandwidth would need to provide sufficiently high resolution to detect such small movements. As another example, for an indoor VR scenario, large gestures would require meter- or possibly centimeter-level resolution, which would not require as high a bandwidth as millimeter-level resolution.

Another factor may be related to the UE's capabilities. For example, a UE may only support a maximum bandwidth of 100 MHz, and therefore, the bandwidth of the sensing waveform should not exceed 100 MHz.

The time duration selected for the sensing waveform may also be based on one or more factors. One factor may be related to the Doppler resolution (also referred to as "velocity resolution") desired for environment sensing. For example, the Doppler resolution is given by $\lambda/2T$, where $\lambda$ is the wavelength and T is the duration chosen to analyze the Doppler effect. A larger value of T would result in a higher resolution but at the cost of higher latency.

Another factor may be related to the application scenario. For example, for a V2X scenario, a V-UE requires a reasonably accurate Doppler estimation with low latency due to the high mobility of V-UEs. As such, a time duration should be selected that balances the need for an accurate Doppler estimate within a short period of time. As another example, for an indoor VR scenario, large gesture motions are typically made slowly. In such a scenario, the Doppler resolution should be high enough to capture the movement, and a high latency is permissible due to the lower speed of the movement.

Another factor may be related to the UE's capabilities. For example, a UE may not be able to achieve the fast computation and short time estimation needed for low latency Doppler estimation, and may instead only be able to process one long time period.

Another factor may be related to the available time/frequency resources for the sensing waveform. For example, if only 4%, for example, of available resources are permitted to be used for environment sensing, then the time available for Doppler estimation will be limited.

The antenna configuration selected for the sensing waveform may also be based on one or more factors. One factor may be related to the angular resolution of the environment sensing. For example, angle resolution is roughly given by $\lambda/D$, where $\lambda$ is the wavelength and D is the size of the antenna array. Thus, the larger the antenna array (i.e., the more antenna elements in the array), the finer the angle resolution.

Another factor may be related to the application scenario. For example, for an industrial IoT scenario, a robotic arm may require highly accurate direction control, and therefore, the environment sensing device may need to be provided with a larger antenna array.

Another factor may be related to the UE's capabilities. For example, a UE may be configured with only one specific antenna array, which would limit the angle resolution. For example, the UE may have been manufactured to have only one antenna array, or may only have one antenna array capable of providing angle information.

As will be appreciated, in addition to the above-described NR-based solutions, the techniques described herein could also be used in unlicensed mmW WLAN bands (e.g., 60 GHz bands) and terahertz (THz) bands. As such, the disclosure is not limited to mmW frequency bands. Further, in addition to determining the parameters for using uplink RF signals for environment sensing, similar parameters could be used to determine the parameters for using downlink RF signals for environment sensing, especially in the case of small cell base stations or WLAN APs. Similarly, the parameters for using sidelink transmissions for environment sensing could be determined similarly to the parameters for using uplink RF signals for environment sensing.

Figure 10A:
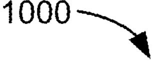

FIG. 10A illustrates an example method 1000 for environment sensing, according to aspects of the disclosure. The method 1000 may be performed by a UE configured to perform environment sensing (e.g., having the hardware and software needed to implement environment sensing), such as electronic device 300.

At 1010, the UE receives one or more transmission parameters for an environment sensing RF signal, the one or more transmission parameters based on one or more factors, the environment sensing RF signal comprising an RF signal configured to transmit information on one or more OFDM symbols. The UE may receive the one or more transmission parameters from its serving base station. In an aspect, the one or more transmission parameters may be received in a configuration for the RF signal. In an aspect, operation 1010 may be performed by sensing component 333, wireless communication device 330, processing system 310, and/or working memory 335, any or all of which may be considered means for performing this operation.

At 1020, the UE transmits the environment sensing RF signal in accordance with the one or more transmission parameters. In an aspect, operation 1020 may be performed by sensing component 333, wireless communication device 330, processing system 310, and/or working memory 335, any or all of which may be considered means for performing this operation.

Figure 10B:
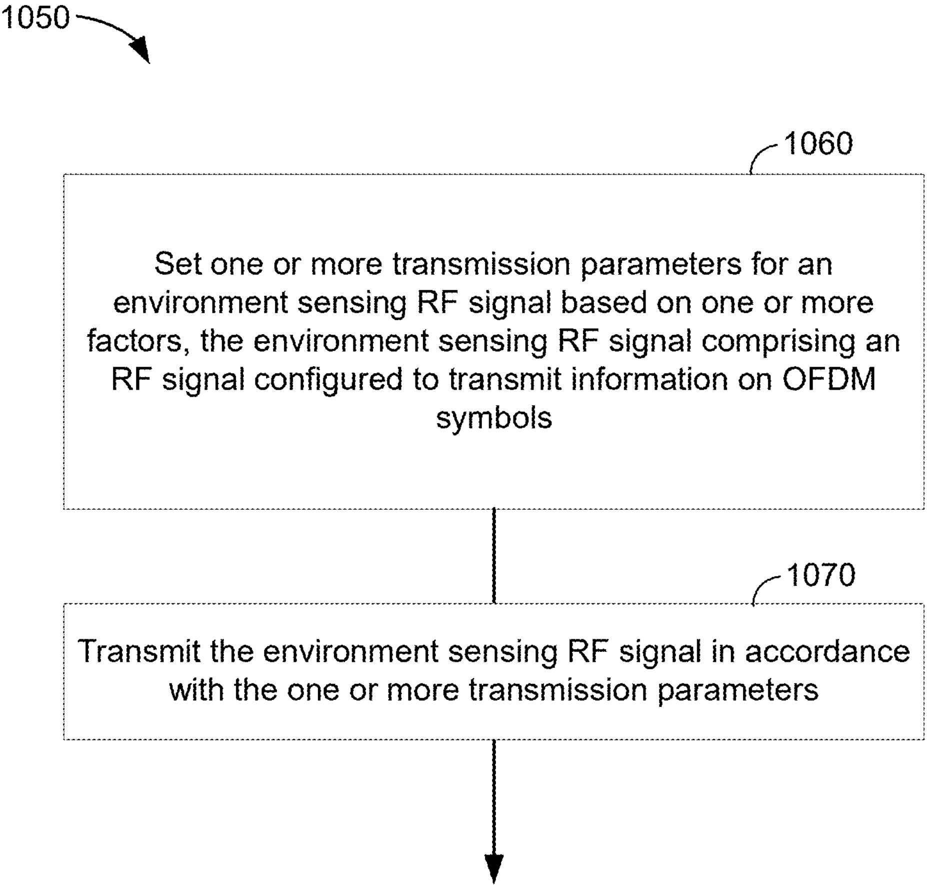

FIG. 10B illustrates an example method 1050 for liveliness detection using radar, according to aspects of the disclosure. The method 1050 may be performed by an electronic device, such as electronic device 300.

At 1060, the electronic device configures one or more transmission parameters for an environment sensing RF signal based on one or more factors, the environment sensing RF signal comprising an RF signal configured to transmit information on OFDM symbols. In an aspect, operation 1060 may be performed by sensing component 333, wireless communication device 330, processing system 310, and/or working memory 335, any or all of which may be considered means for performing this operation.

At 1070, the electronic device transmits the environment sensing RF signal in accordance with the one or more transmission parameters. In an aspect, operation 1070 may be performed by sensing component 333, wireless communication device 330, processing system 310, and/or working memory 335, any or all of which may be considered means for performing this operation.

FIG. 11 illustrates an example method 1100 for environment sensing, according to aspects of the disclosure. The method 1100 may be performed by a base station, such as electronic device 300 (when configured as a base station).

At 1110, the base station transmits, to a UE (e.g., any of the UEs described herein), one or more transmission parameters for an environment sensing RF signal, the one or more transmission parameters based on one or more factors, the environment sensing RF signal comprising an RF signal configured to transmit information on one or more OFDM symbols. In an aspect, operation 1110 may be performed by sensing component 333, wireless communication device 330, processing system 310, and/or working memory 335, any or all of which may be considered means for performing this operation.

At 1120, the base station receives the environment sensing RF signal from the UE. In an aspect, operation 1120 may be performed by sensing component 333, wireless communication device 330, processing system 310, and/or working memory 335, any or all of which may be considered means for performing this operation.

As will be appreciated, the methods 1000 and 1100 enable the reuse of 5G NR signals for environment sensing.

Figure 12:
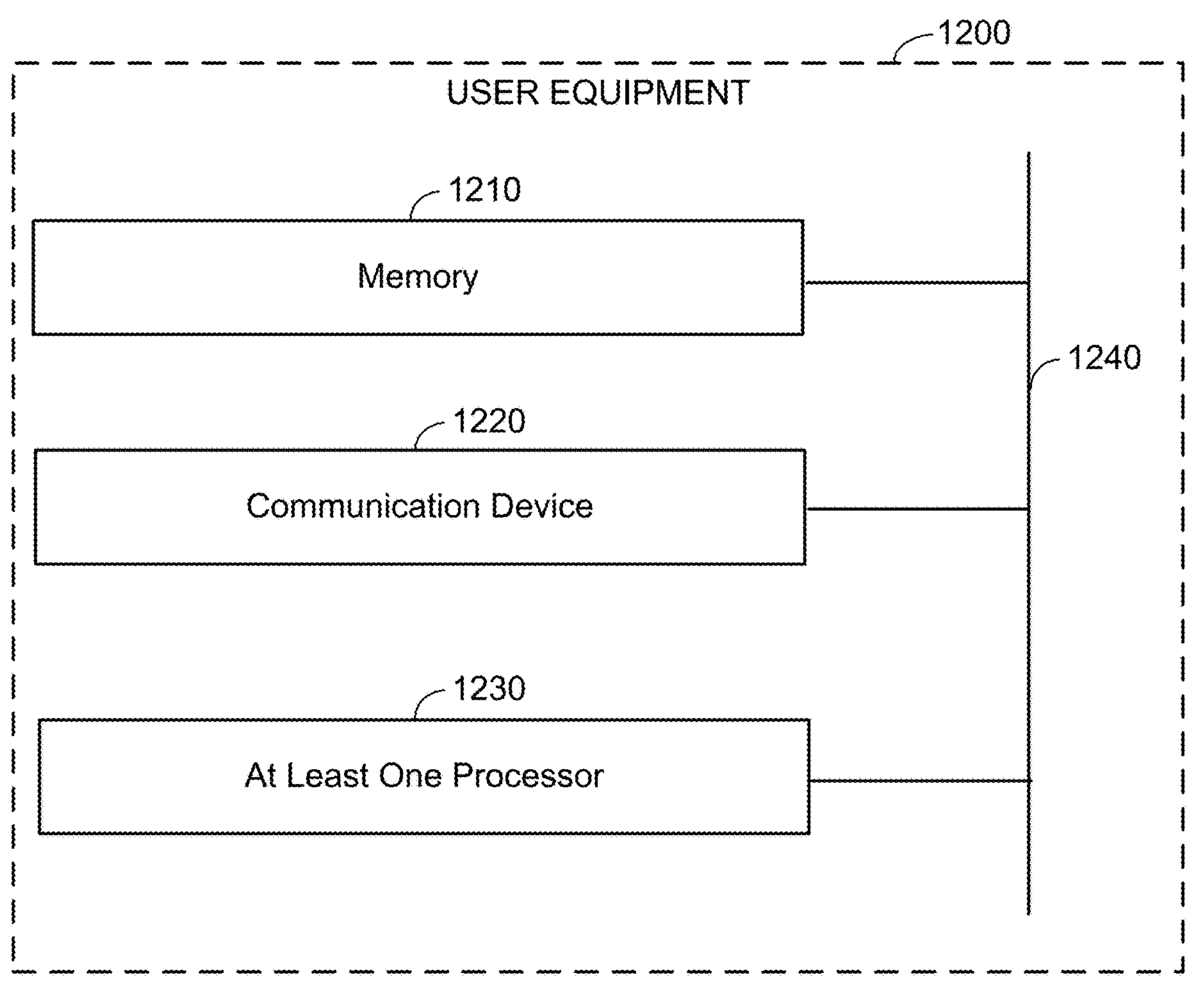

FIG. 12 illustrates an example user equipment 1200, according to aspects of the disclosure. The user equipment 1200 may include a memory 1210, a communication device 1220, and at least one processor 1230. The memory 1210, the communication device 1220, and the at least one processor 1230 may be coupled to each other over a data bus 1240. In an aspect, the memory 1210 may correspond to storage device(s) 325 and/or working memory 335, the communication device 1220 may correspond to wireless communication device 330 and/or sensing component 333, and the at least one processor 1230 may correspond to processing system 310 and/or sensing component 333.

Figure 13:
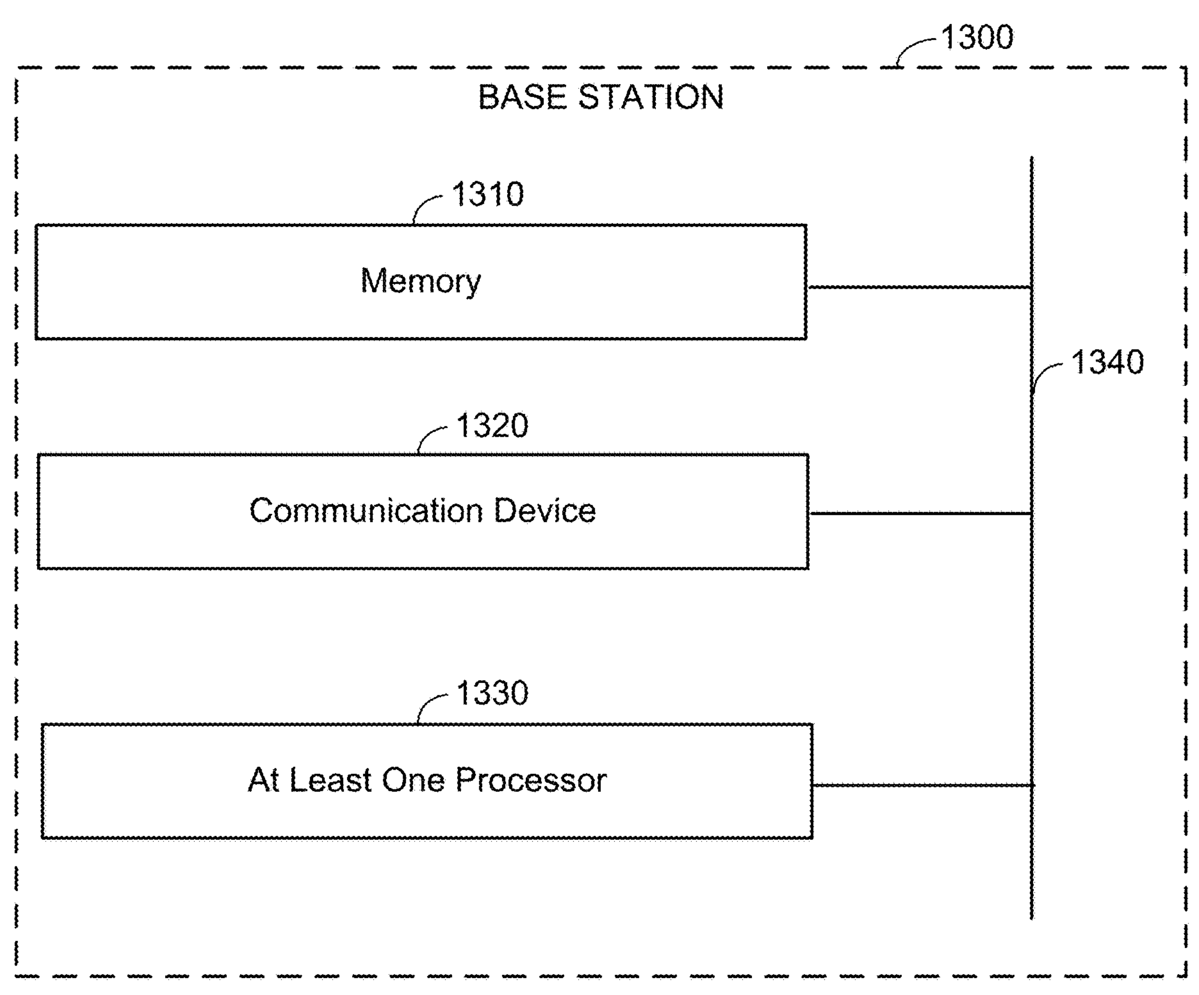

FIG. 13 illustrates an example base station 1300, according to aspects of the disclosure. The base station 1300 may include a memory 1310, a communication device 1320, and at least one processor 1330. The memory 1310, the communication device 1320, and the at least one processor 1330 may be coupled to each other over a data bus 1340. In an aspect, the memory 1310 may correspond to storage device (s) 325 and/or working memory 335, the communication device 1320 may correspond to wireless communication device 330 and/or sensing component 333, and the at least one processor 1330 may correspond to processing system 310 and/or sensing component 333.

FIG. 14 illustrates an example user equipment 1400 represented as a series of interrelated functional modules. The user equipment 1400 may include a module for receiving 1410 and a module for transmitting 1420. In an aspect, the module for receiving 1410 may correspond to sensing component 333, wireless communication device 330, processing system 310, and/or working memory 335, and the module for transmitting 1420 may correspond to sensing component 333, wireless communication device 330, processing system 310, and/or working memory 335.

Figure 15:
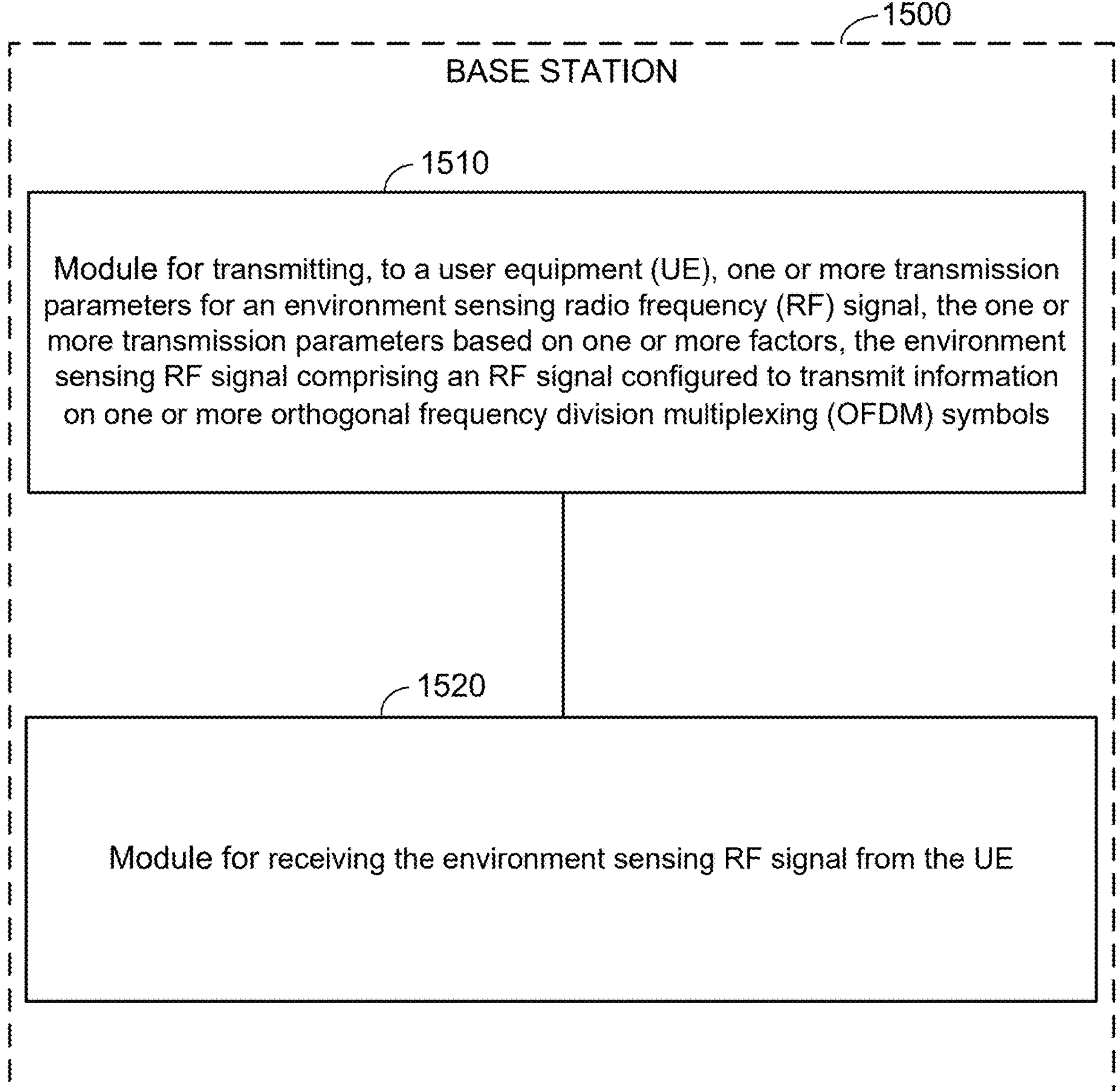

FIG. 15 illustrates an example base station 1500 represented as a series of interrelated functional modules. The base station 1500 may include a module for transmitting 1510 and a module for receiving 1520. In an aspect, the module for transmitting 1510 may correspond to sensing component 333, wireless communication device 330, processing system 310, and/or working memory 335, and the module for receiving 1520 may correspond to sensing component 333, wireless communication device 330, processing system 310, and/or working memory 335.

The functionality of the modules of FIGS. 14 and 15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14 and 15, as well as other components and functions described herein, may be implemented using any suitable means. Such means also may be implemented, at least in part, using corresponding structure as taught herein. For example, the components described above in conjunction with the "module for" components of FIGS. 14 and 15 also may correspond to similarly designated "means for" functionality. Thus, in some aspects one or more of such means may be implemented using one or more of processor components, integrated circuits, or other suitable structure as taught herein.

Since both 5G communications and environment sensing use mmW frequencies, it would be beneficial to reuse the 5G OFDM waveform as the environment sensing waveform, thereby providing improved communication (e.g., by decreasing the amount of time needed for beam alignment) and additional dimensionality for radar applications. In order to use 5G mmW RF signals being used for communication for environment sensing, the environment sensing device needs to determine how to combine the sensing waveform (i.e., the mmW RF signals being used for environment sensing) with the 5G OFDM waveform (i.e., the mmW RF signals being used to communicate in accordance with the 5G standard). The environment sensing device also needs to determine how to transmit the sensing waveform.

The present disclosure provides techniques to leverage existing 5G communication waveforms (i.e., OFDM waveforms) at mmW frequencies for environment sensing. In a first solution, where the environment sensing device is a UE, the UE can use the existing 5G uplink OFDM waveform for environment sensing. In a second solution, again where the environment sensing device is a UE, the UE can leverage the physical random-access channel (PRACH) in 5G for environment sensing. In a third solution, an indication of the UE's environment sensing capability may be added to the capability report the UE sends to the network. In a fourth solution, the UE's serving base station may indicate the sensing waveform pattern to the UE.

Referring now to the first solution, a UE (as the environment sensing device) can use existing uplink OFDM waveforms, including sounding reference signals (SRS), the physical uplink shared channel (PUSCH), and the physical uplink control channel (PUCCH), as the radar signal (i.e., the mmW RF signal) for environment sensing. SRS are used by a base station to obtain channel state information (CSI) for a UE. CSI describes how an RF signal propagates from the UE to the base station and represents the combined effect of scattering, fading, and power decay with distance. The base station uses the SRS for resource scheduling, link adaptation, MIMO, beam management, etc. The PUCCH carries uplink control information (UCI), such as scheduling requests, CSI reports, a channel quality indicator (CQI), a precoding matrix indicator (PMI), a rank indicator (RI), and hybrid automatic repeat request (HARQ) feedback. The physical uplink shared channel (PUSCH) carries data for the UE, and may additionally be used to carry a buffer status report (BSR), a power headroom report (PHR), and/or UCI.

To use these existing channels for environment sensing, a UE can transmit uplink RF signals on these channels as configured by the serving base station (e.g., for uplink data transmission, channel estimation, etc.), but then monitor for the corresponding reflected RF signals. That is, the UE's serving base station indicates to (i.e., configures) the UE at least the time (e.g., symbols, slots, radio frames, etc.) and frequency (e.g., physical resource blocks, subcarriers, bandwidth parts, etc.) resources on which to transmit SRS, PUSCH, and/or PUCCH. The UE can transmit SRS, PUSCH, and/or PUCCH according to the indicated time and frequency resources (i.e., according to the configuration) received from the base station. The UE can then monitor for reflections of the transmitted SRS, PUSCH, and/or PUCCH. Alternatively, or additionally, a UE can transmit uplink signals for environment sensing only that are configured as OFDM signals.

Figure 16:
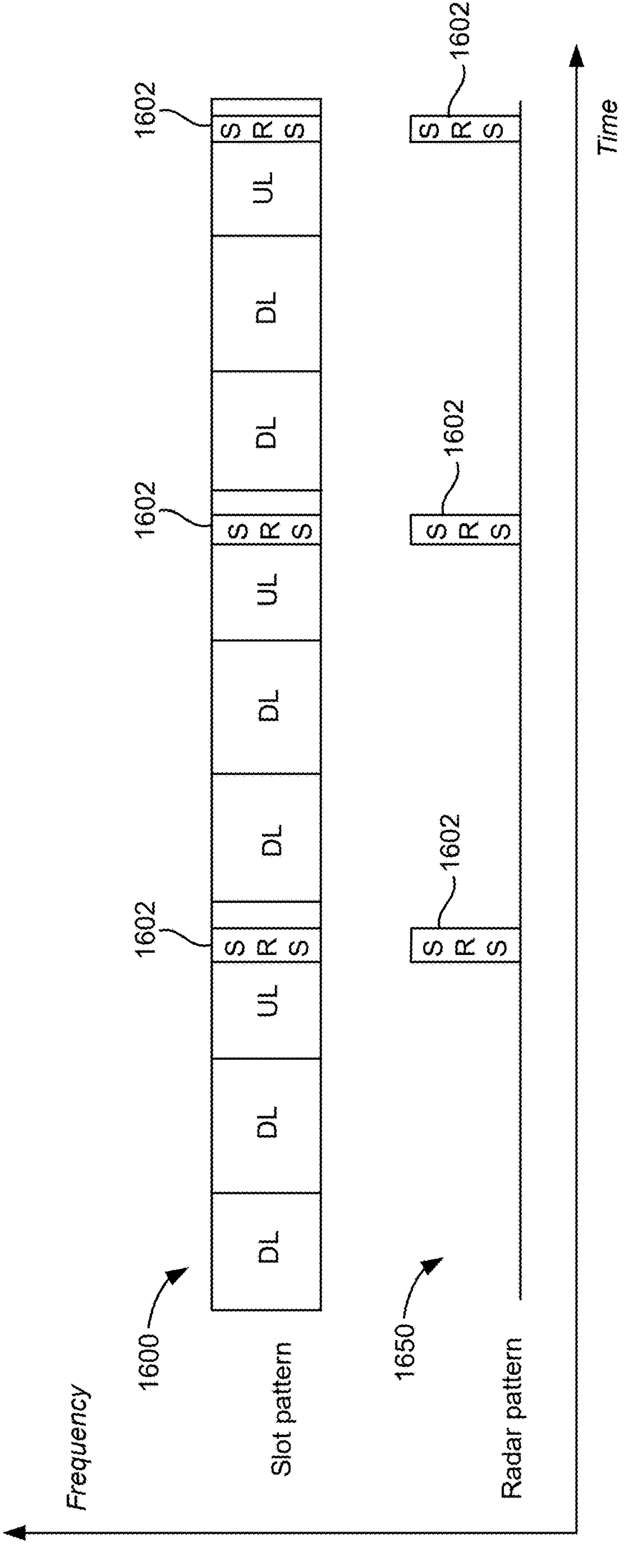
FIG. 16 illustrates an example of using an existing wideband sounding reference signal (SRS) as a radar signal for environment sensing, according to aspects of the disclosure.

FIG. 16 illustrates an example of using an existing wideband SRS as a radar signal for environment sensing, according to aspects of the disclosure. Specifically, FIG. 16 illustrates a slot pattern 1600 used for uplink communication and a radar pattern 1650 used for environment sensing. The slot pattern 1600 is a pattern of two downlink (labelled "DL") slots followed by one uplink (labelled "UL") slot. Within each uplink slot is an SRS 1602 transmitted on one or more symbols that can be reused as an environment sensing signal. The SRS 1602 in an uplink slot is usually transmitted with a fixed and periodic pattern to enable the receiving base station to measure properties of the uplink channel between the UE and the base station. The SRS pattern can be considered as the radar pattern 1650. Thus, the UE transmits uplink data to the base station during the uplink slots of the slot pattern 1600, transmits SRS 1602 to the base station for channel estimation, and then monitors for reflections of the SRS 1602 to reuse the SRS 1602 for environment sensing.

Using the OFDM waveform for environment sensing has some disadvantages, however. For example, there may be some radar accuracy loss due to the sensitivity to carrier frequency offset (CFO) using typical oscillators. To compensate, the UE's capability for environment sensing using existing 5G RF signals should include the UE's hardware design for the sensing, for example, its oscillator capability.

Referring now to the second solution, a UE (as the environment sensing device) can reuse the existing PRACH, also referred to as the random-access channel (RACH), in 5G as the radar signal for environment sensing. More specifically, the UE can use a PRACH preamble as the radar signal for environment sensing. A PRACH procedure (also referred to a "random-access procedure") allows a UE to perform network access and achieve uplink synchronization. Specifically, during a PRACH procedure, the UE transmits a specific pattern, called a preamble (also referred to as a "sequence"), on the PRACH to differentiate the UE's access request from access requests from other UEs. The preamble may be encoded based on a Zadoff Chu sequence.

To use a PRACH preamble for environment sensing, a UE transmits a PRACH preamble and monitors for the corresponding reflected RF signals. The UE may transmit the PRACH preamble as part of a network access or network synchronization procedure, or only for environment sensing.

Figure 17A:
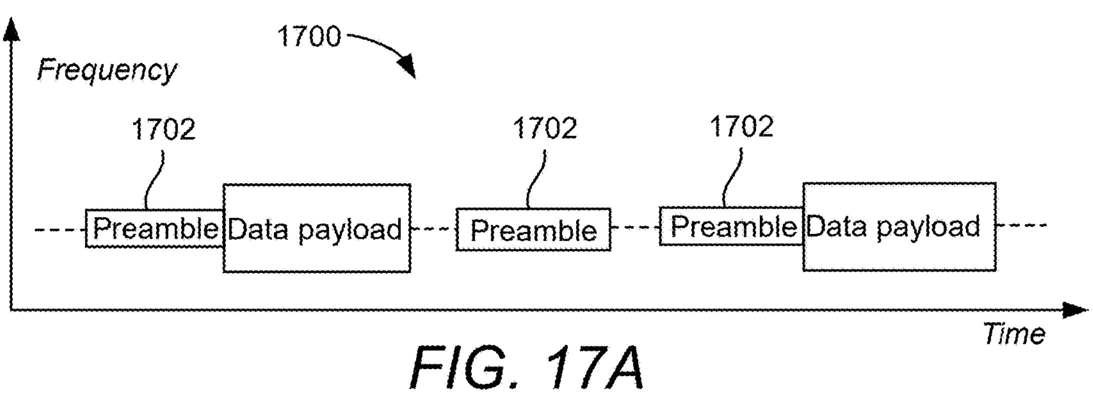
FIG. 17A is a diagram illustrating an example pattern of random-access preamble transmissions, according to aspects of the disclosure.

FIG. 17A is a diagram 1700 illustrating an example pattern of PRACH preamble transmissions, according to aspects of the disclosure. The periodic transmission of the PRACH preambles 1702 is considered as a pulse-based waveform, meaning that accuracy should be acceptable. The density of the PRACH preambles 1702 is lower than other uplink channels, with a narrower bandwidth (as illustrated by the PRACH preambles 1702 being shorter than the illustrated data payloads). In addition, the PRACH preambles 1702 have a shorter length than the data payloads.

Figure 17B:
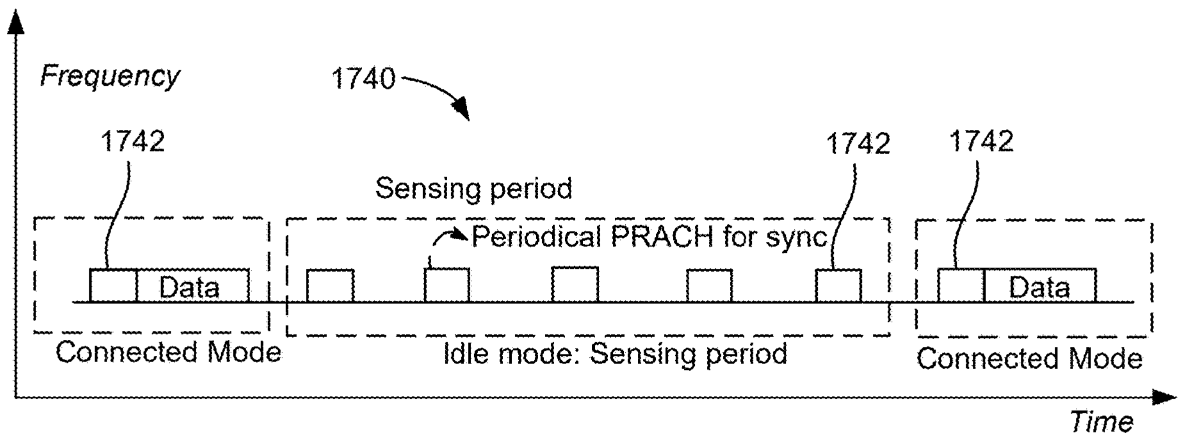
FIGS. 17B and 17C are diagrams illustrating the use of random-access preambles for environment sensing during various radio resource control (RRC) states, according to aspects of the disclosure.
Figure 17C:
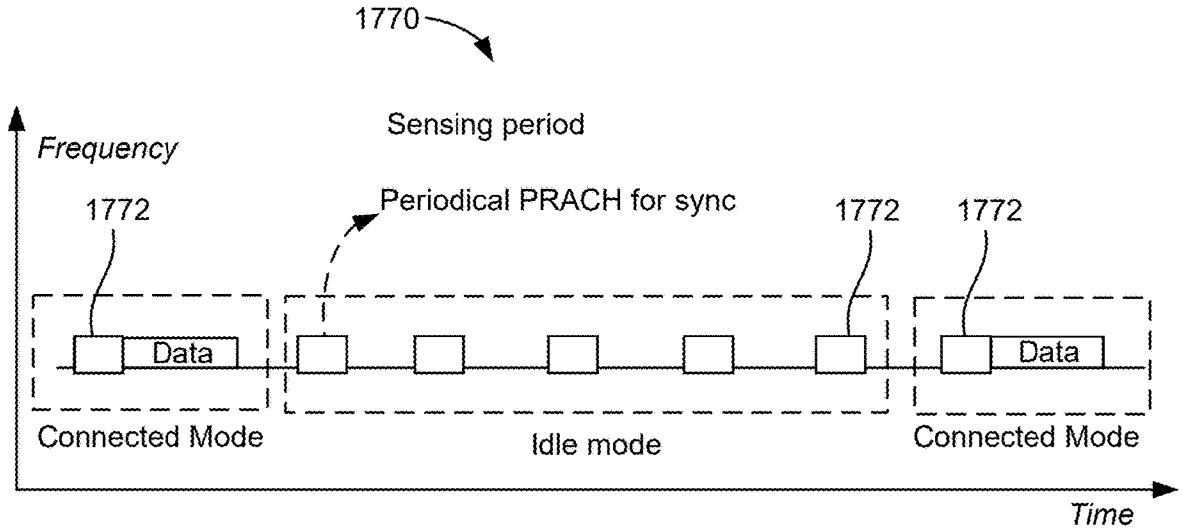

FIGS. 17B and 17C are diagrams illustrating the use of PRACH preambles for environment sensing during various radio resource control (RRC) states, according to aspects of the disclosure. When a UE is powered up, it is initially in the RRC disconnected/idle state. After a PRACH procedure, the UE is in the RRC connected state. If there is no activity from the UE for a short time, it can suspend its session by moving to the RRC inactive state. The UE can resume its session by performing another PRACH procedure to transition back to the RRC connected state. Thus, the UE needs to perform a PRACH procedure to transition to the RRC connected state, regardless of whether the UE is in the RRC idle state or the RRC inactive state.

FIG. 17B is a diagram 1740 illustrating a scenario in which a UE uses the PRACH preambles 1742 transmitted while the UE is in the RRC idle state for environment sensing. Within the idle state, the UE would monitor for reflections of the PRACH preambles 1742 and process them to detect objects and/or motions of the objects reflecting the PRACH preambles 1742.

FIG. 17C is a diagram 1770 illustrating a scenario in which a UE can use the PRACH preambles 1772 transmitted while the UE is in any RRC state for environment sensing. Thus, whether in the idle state or the connected state, as illustrated, the transmitted PRACH preambles 1772 can be reused for environment sensing. The UE can monitor for reflections of the PRACH preambles 1772 and process them to detect objects and/or motions of the objects reflecting the PRACH preambles 1772.

Referring now to the third solution disclosed herein, a UE may indicate its capability to perform environment sensing to the network (e.g., the serving base station). The indicated capability may be at least an indication that the UE has the capability to perform environment sensing using existing uplink 5G communication signals (e.g., SRS, PUSCH, PUCCH, PRACH). The indicated capability may be related to at least the hardware constraints of the UE to support the environment sensing function, such as the UE's ability to detect and process reflections of uplink RF signals used for 5G communication. The indicated capability may also be related to the UE's sensing level, such as the sensing granularity (i.e., the level of detail or resolution of the sensing), the UE's supported bandwidth, and the power control for sensing signals.

Referring now to the fourth solution, in which the network (e.g., the serving base station) indicates the environment sensing configuration, there are two modes for the sensing procedure. In the first mode, a UE can leverage the 5G uplink signals it transmits for communication purposes for environment sensing based on the UE's implementation. The uplink transmission configuration received from the network is only for uplink transmissions for 5G communication, and does not configure the UE to transmit or use uplink RF signals for environment sensing.

FIG. 18A illustrates an example method 1800 for configuring a UE for uplink transmission according to the first mode disclosed herein. At 1802, a network entity (e.g., the UE's serving base station) sends an uplink transmission configuration message to the UE. The uplink transmission configuration message may specify the time and/or frequency resources that the UE may use for uplink transmission for communication purposes, such as time and/or frequency resources for SRS, a PUCCH, or a PUSCH.

At 1804, the UE transmits uplink data on the configured uplink resources. For example, the UE may transmit SRS, or may transmit data on a PUCCH and/or a PUSCH, on the configured resources. The uplink signal may reflect off one or more objects 1808, and the UE may monitor for reflections 1810 (i.e., reflected signals) of the transmitted uplink signals and process them to detect the object(s) 1808 and/or motions of the object(s) 1808 reflecting the uplink signals. Because the UE is not configured by the network to perform environment sensing, it performs the environment sensing based on, for example, manufacturer design or user instruction.

In the second mode, the network (e.g., the serving base station) can configure a UE with uplink time and/or frequency resources for environment sensing. Specifically, the UE can send the network an environment sensing request indicating that the UE is requesting to be configured with resources for environment sensing. The sensing request may include the UE's capability for using uplink communication signals for environment sensing to enable the network to configure the UE with the appropriate resources. Alternatively, or additionally, the sensing request may indicate the UE's maximum transmit power and/or the time and/or frequency resources on which the UE is requesting to transmit uplink RF signals for environment sensing. For example, the request may identify or otherwise specify that the UE is requesting to use SRS, PUCCH, and/or PUSCH for environment sensing.

The network may respond to the sensing request with an uplink transmission configuration configuring the UE with time and/or frequency resources on which to transmit uplink RF signals. The uplink transmission configuration may configure the UE with resources for environment sensing only or for both sensing and communication with the network.

FIG. 18B illustrates an example method 1850 for configuring a UE for uplink transmission according to the second mode disclosed herein. At 1852, a UE sends an environment sensing request to the network (e.g., the UE's serving base station). As described above, the sensing request may include the UE's capability for using uplink communication signals for environment sensing and/or an indication of the UE's maximum transmit power and/or the time and/or frequency resources on which the UE is requesting to transmit uplink RF signals for environment sensing. The UE may transmit the sensing request in response to user input or because the UE has been manufactured to perform environment sensing using uplink 5G RF signals as described herein.

At 1854, the network sends an uplink transmission configuration message to the UE. The uplink transmission configuration message may specify the time and/or frequency resources that the UE may use for uplink transmission, such as time and/or frequency resources for SRS, a PUCCH, or a PUSCH. The response may indicate that the UE is to use the configured resources for environment sensing only or for both environment sensing and communication with the network.

At 1856, the UE transmits uplink RF signals on the configured uplink resources. For example, the UE may transmit SRS, or may transmit data on a PUCCH and/or a PUSCH, on the configured resources. The uplink RF signals may be for environment sensing only, or for both environment sensing and communication with the network, depending on the configuration received from the network at 1854. The uplink RF signals may reflect off an object 1858, and UE may monitor for reflections 1860 (i.e., reflected RF signals) of the transmitted uplink RF signals and process them to detect the object(s) 1858 and/or motions of the object(s) 1858 reflecting the uplink RF signals.

Still referring to the fourth solution described herein, in which the network configured the UE with the resources to be used for environment sensing, the network may configure uplink time and/or frequency resources specifically for environment sensing to make the sensing more effective. However, the configured resources are still 5G wireless communication resources for data transmission (e.g., SRS, PUCCH, PUSCH) and network synchronization (e.g., PRACH). The uplink transmission configuration may include transmit power control information (e.g., specifying the uplink transmit power the UE should use for environment sensing), bandwidth configuration information (specifying the bandwidth the UE should use for environment sensing), and time-division duplex (TDD) pattern (specifying the different slots for uplink transmission and downlink reception). The transmission configuration may also include an indication that the UE is to use the configured resources for environment sensing.

Parameters that the network may change for uplink resources that are to be used for environment sensing include the bandwidth of the configured resources, the uplink transmit power to be used when transmitting on the configured resources, the TDD pattern for the configured resources, and/or whether the configured resources are repetitions. For example, the indicated sensing resources may have a larger bandwidth than resources for communication only. As another example, the transmission configuration may indicate that the UE should use a lower transmit power when transmitting on the configured sensing resources. As yet another example, the indicated sensing resources may have a higher density TDD pattern (e.g., more frequent uplink slots). As another example, the indicated sensing resources may be repetitions of a previous uplink channel (e.g., a repetition of the previous PUCCH).

Figure 19:
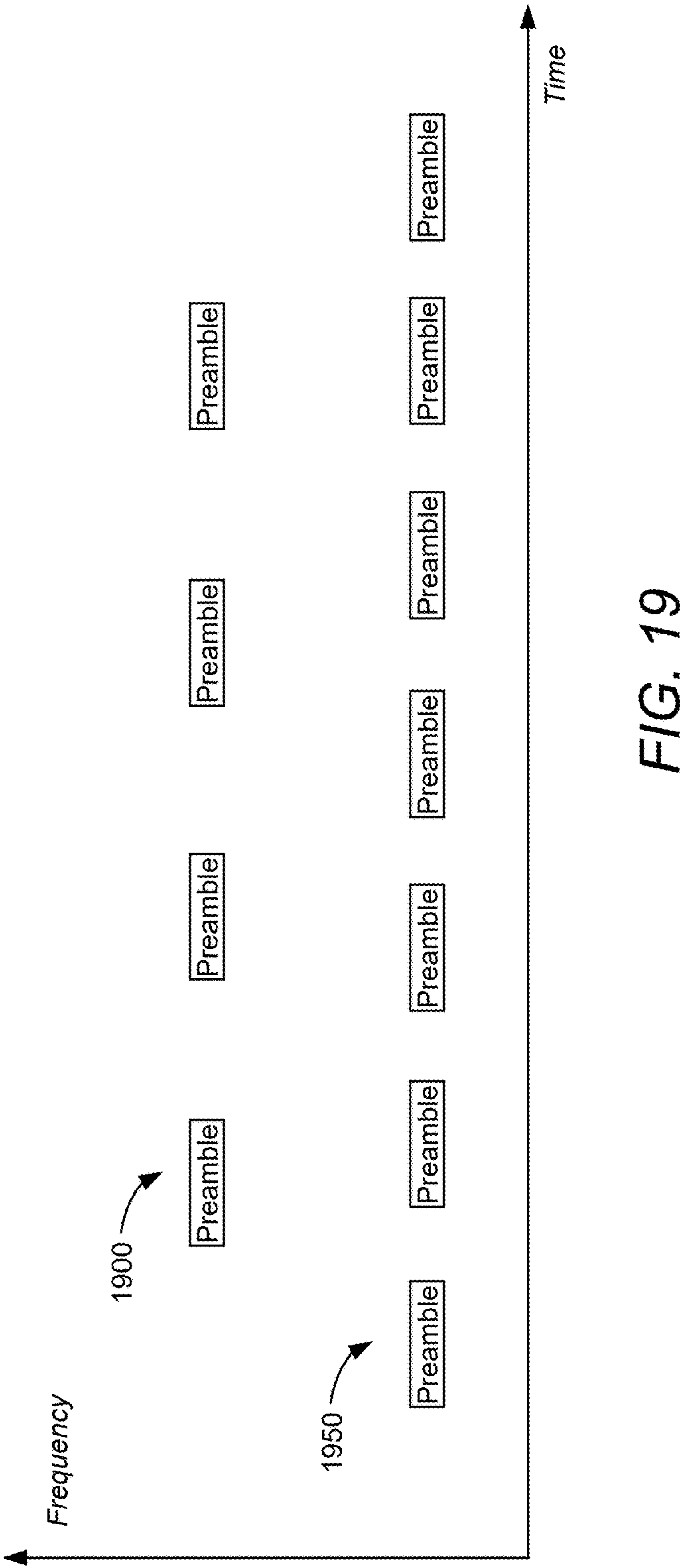
FIG. 19 illustrates an example modification of random-access preamble transmissions for environment sensing, according to aspects of the disclosure.

FIG. 19 illustrates an example modification of PRACH preamble transmissions for environment sensing, according to aspects of the disclosure. In the example of FIG. 19, a first series of PRACH preambles 1900 is illustrated that has a "normal" density. A "normal" density in this context is the density with which a UE transmits PRACH preambles in a 5G network for network access and/or network synchronization. FIG. 19 further illustrates a second series of PRACH preambles 1950 that has an increased density and shorter preamble length. Although the PRACH preambles in the second series of PRACH preambles 1950 are 5G PRACH preambles, their characteristics (here, density and length) have been modified to make them more effective for environment sensing. Specifically, the higher density and shorter length makes the PRACH preambles more similar to radar pulses, thereby improving resolution of the sensed environment.

As will be appreciated, in addition to the above-described NR-based solutions, the techniques described herein could also be used in unlicensed mmW WLAN bands (e.g., 60 GHz bands) and terahertz (THz) bands. As such, the disclosure is not limited to mmW frequency bands. Further, in addition to determining resources for uplink RF signals for environment sensing, similar techniques could be used to determine resources for using downlink RF signals for environment sensing, especially in the case of small cell base stations or WLAN APs. For example, such a base station could use positioning reference signals (PRS), a physical downlink control channel (PDCCH), a physical downlink shared channel (PDSCH), a physical broadcast channel (PBCH), demodulation reference signals (DMRS), channel state information reference signals (CSI-RS), primary synchronization signals (PSS), or secondary synchronization signals (SSS) for downlink environment sensing. Further, resources for using sidelink transmissions for environment sensing could be determined similarly to the resources for using uplink RF signals for environment sensing.

Figure 20A:
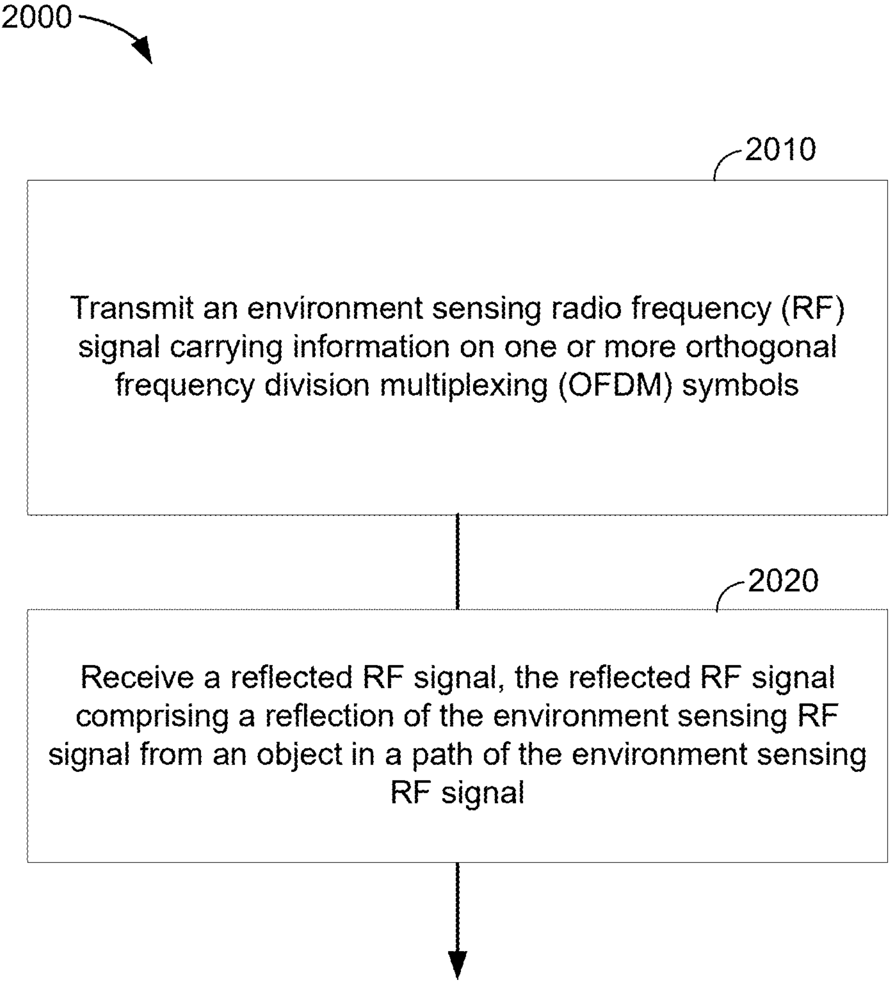
FIGS. 20A, 20B, and 21 illustrate example methods for environment sensing, according to aspects of the disclosure.

FIG. 20A illustrates an example method 2000 for environment sensing, according to aspects of the disclosure. The method 2000 may be performed by an electronic device configured to perform environment sensing, such as electronic device 300.

At 2010, the electronic device transmits an environment sensing RF signal carrying information on one or more OFDM symbols. In an aspect, operation 2010 may be performed by sensing component 333, wireless communication device 330, processing system 310, and/or working memory 335, any or all of which may be considered means for performing this operation.

At 2020, the electronic device receives a reflected RF signal, the reflected RF signal comprising a reflection of the environment sensing RF signal from an object in a path of the environment sensing RF signal. In an aspect, operation 2020 may be performed by sensing component 333, wireless communication device 330, processing system 310, and/or working memory 335, any or all of which may be considered means for performing this operation.

Figure 20B:
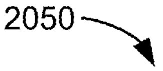

FIG. 20B illustrates an example method 2050 for environment sensing, according to aspects of the disclosure. The method 2050 may be performed by an electronic device configured for environment sensing, such as electronic device 300.

At 2060, the electronic device transmits an environment sensing RF signal on one or more time and/or frequency resources, the environment sensing RF signal configured on the one or more time and/or frequency resources according to a wireless communications standard. In an aspect, operation 2060 may be performed by sensing component 333, wireless communication device 330, processing system 310, and/or working memory 335, any or all of which may be considered means for performing this operation.

At 2070, the electronic device receives a reflected RF signal, the reflected RF signal comprising a reflection of the environment sensing RF signal from an object in a path of the environment sensing RF signal. In an aspect, operation 2070 may be performed by sensing component 333, wireless communication device 330, processing system 310, and/or working memory 335, any or all of which may be considered means for performing this operation.

Figure 21:
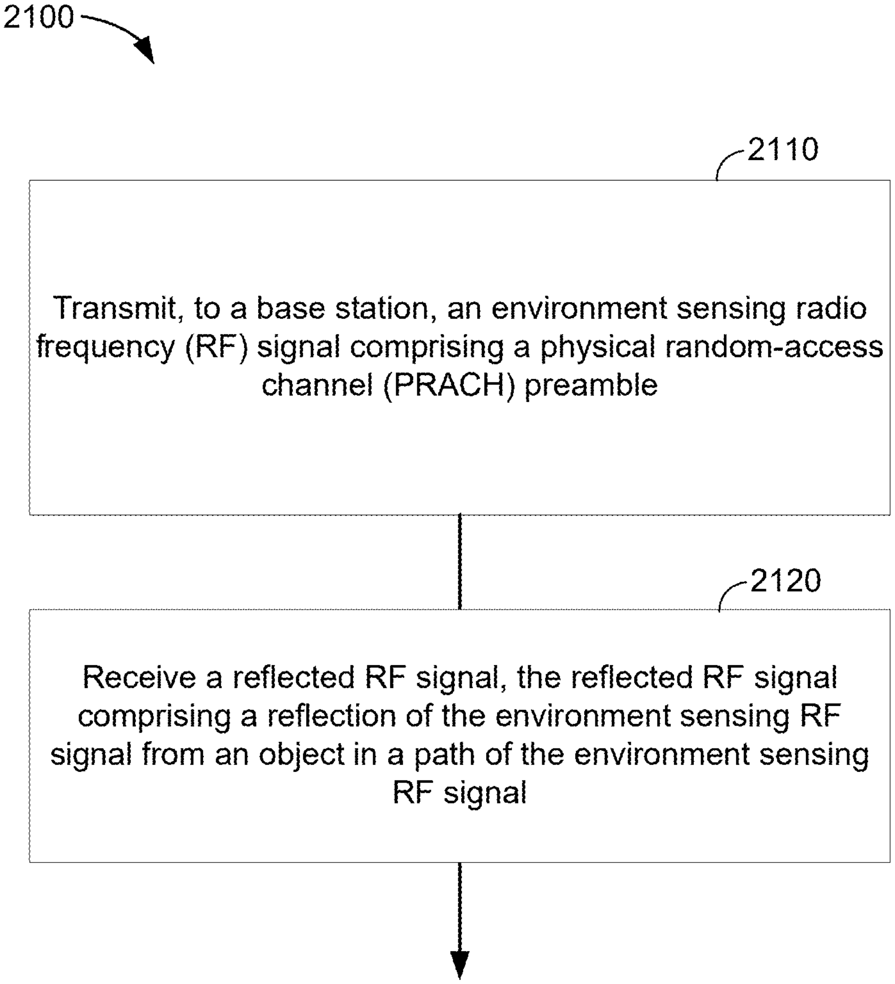

FIG. 21 illustrates an example method 2100 for environment sensing, according to aspects of the disclosure. The method 2100 may be performed by a user equipment (UE) configured to perform environment sensing, such as electronic device 300.

At 2110, the UE transmits, to a base station, an environment sensing RF signal comprising a PRACH preamble. In an aspect, operation 2110 may be performed by sensing component 333, wireless communication device 330, processing system 310, and/or working memory 335, any or all of which may be considered means for performing this operation.

At 2120, the UE receives a reflected RF signal, the reflected RF signal comprising a reflection of the environment sensing RF signal from an object in a path of the environment sensing RF signal. In an aspect, operation 2120 may be performed by sensing component 333, wireless communication device 330, processing system 310, and/or working memory 335, any or all of which may be considered means for performing this operation.

As will be appreciated, the methods 2000 and 2100 enable the reuse of 5G NR signals for environment sensing.

Figure 22:
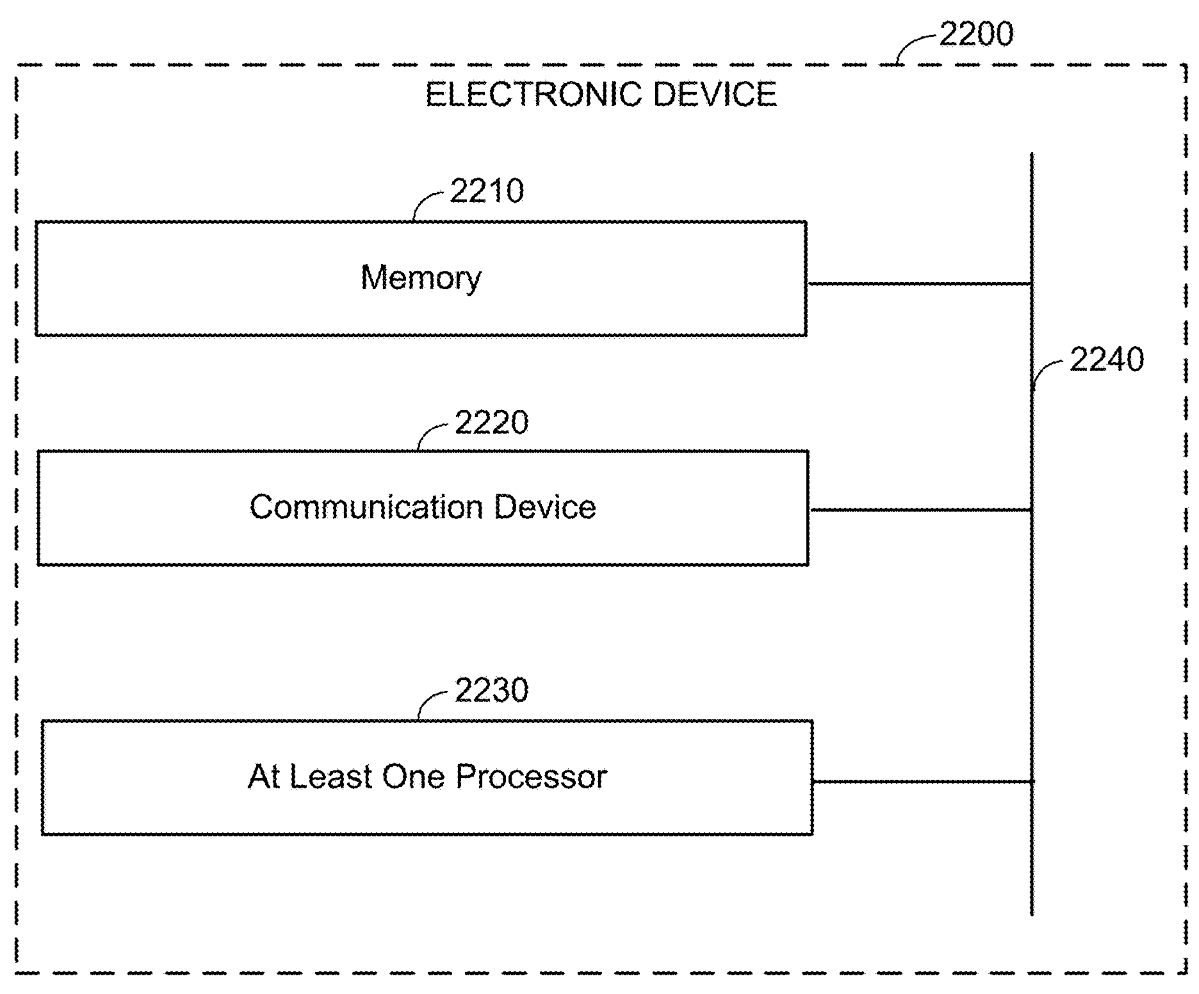
FIGS. 22 to 25 are simplified block diagrams of various apparatuses configured to support environment sensing operations as taught herein.

FIG. 22 illustrates an example electronic device 2200, according to aspects of the disclosure. In an aspect, the electronic device 2200 may be a UE, a base station, etc. The electronic device 2200 may include a memory 2210, a communication device 2220, and at least one processor 2230. The memory 2210, the communication device 2220, and the at least one processor 2230 may be coupled to each other over a data bus 2240. In an aspect, the memory 2210 may correspond to storage device(s) 325 and/or working memory 335, the communication device 2220 may correspond to wireless communication device 330 and/or sensing component 333, and the at least one processor 2230 may correspond to processing system 310 and/or sensing component 333.

Figure 23:
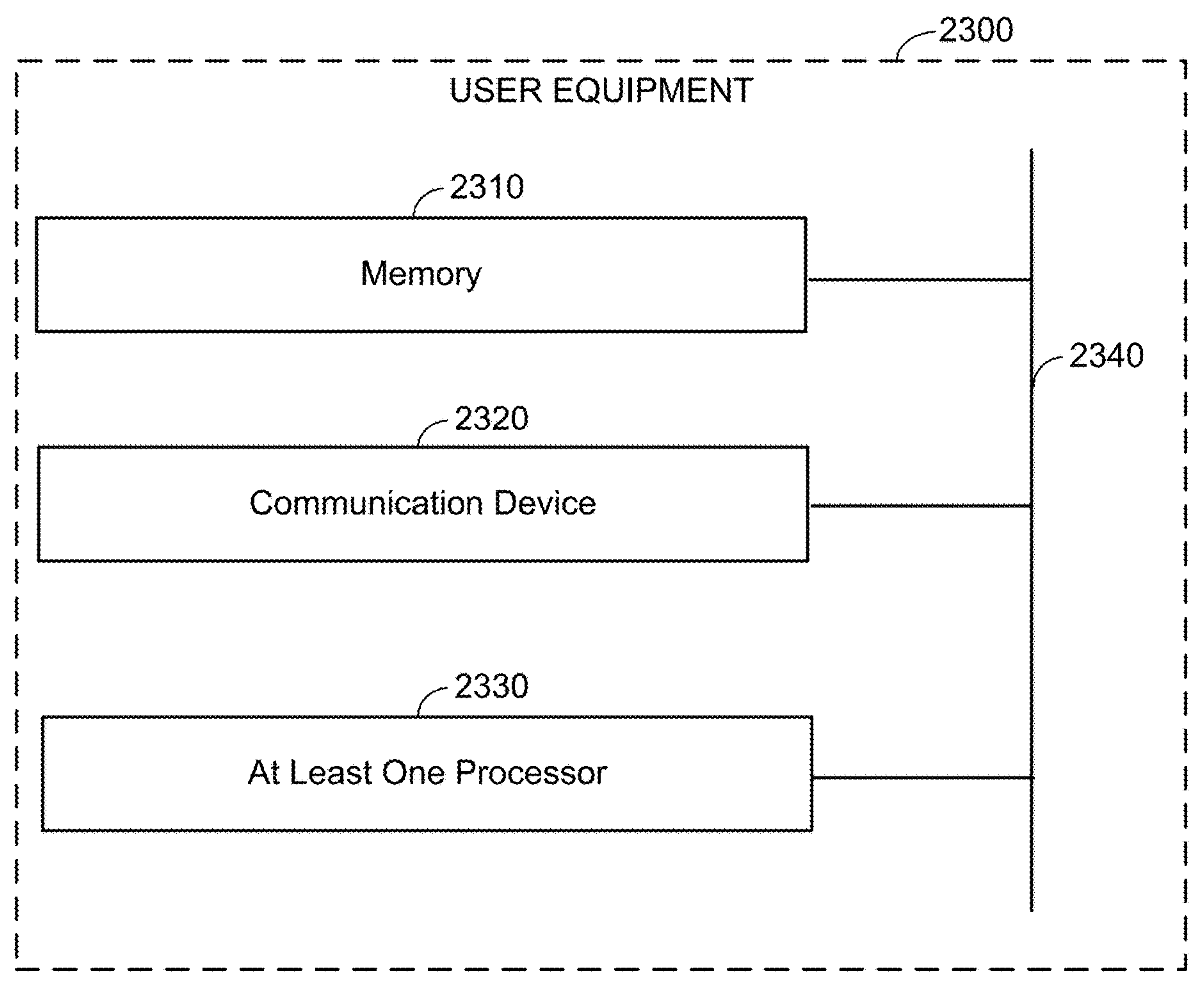

FIG. 23 illustrates an example user equipment 2300, according to aspects of the disclosure. The user equipment 2300 may include a memory 2310, a communication device 2320, and at least one processor 2330. The memory 2310, the communication device 2320, and the at least one processor 2330 may be coupled to each other over a data bus 2340. In an aspect, the memory 2310 may correspond to storage device(s) 325 and/or working memory 335, the communication device 2320 may correspond to wireless communication device 330 and/or sensing component 333, and the at least one processor 2330 may correspond to processing system 310 and/or sensing component 333.

Figure 24:
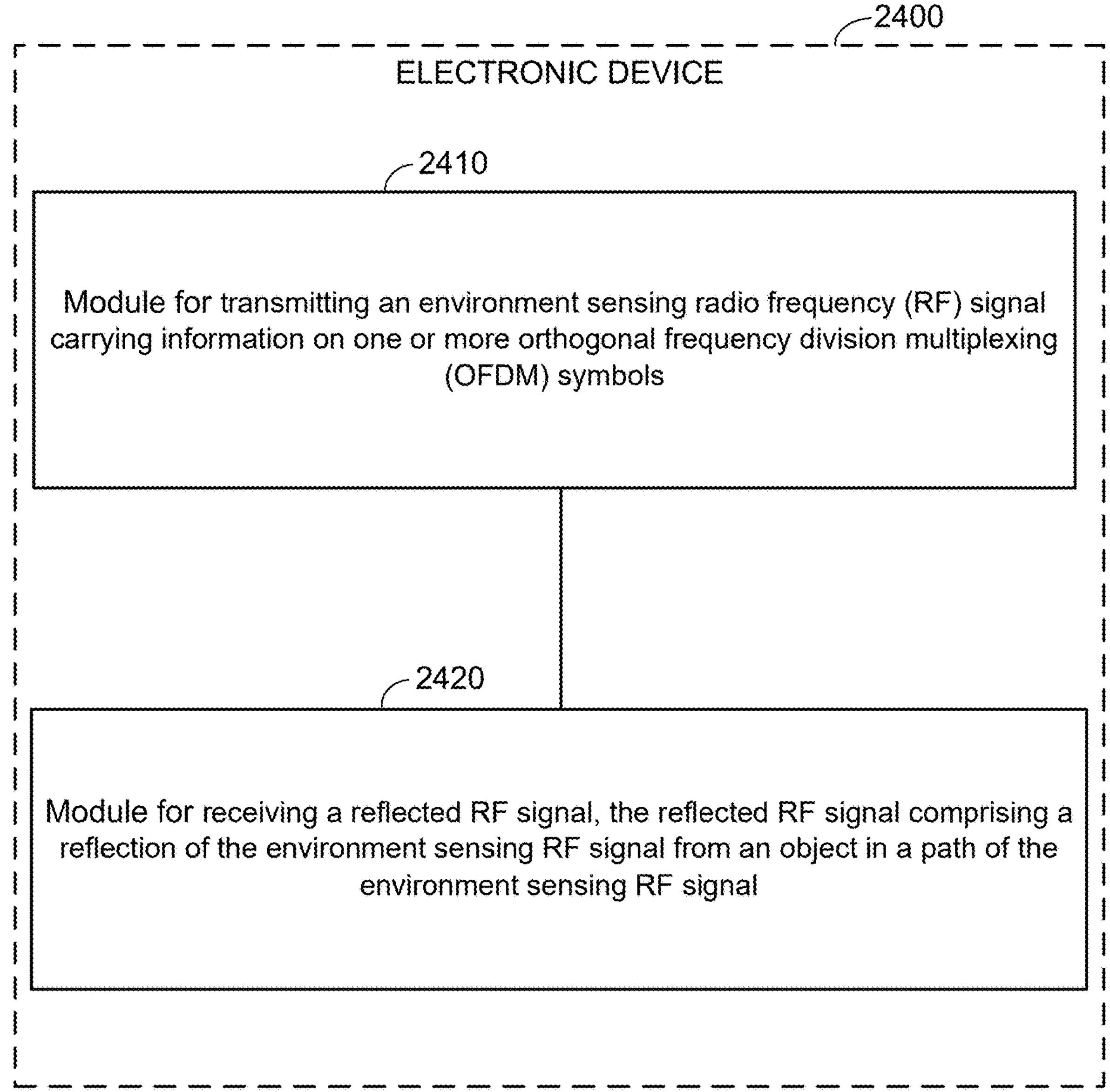

FIG. 24 illustrates an example electronic device 2400 represented as a series of interrelated functional modules. In an aspect, the electronic device 2400 may be a UE, a base station, etc. The electronic device 2400 may include a module for transmitting 2410 and a module for receiving 2420. In an aspect, the module for transmitting 2410 may correspond to sensing component 333, wireless communication device 330, processing system 310, and/or working memory 335, and the module for receiving 2420 may correspond to sensing component 333, wireless communication device 330, processing system 310, and/or working memory 335.

Figure 25:
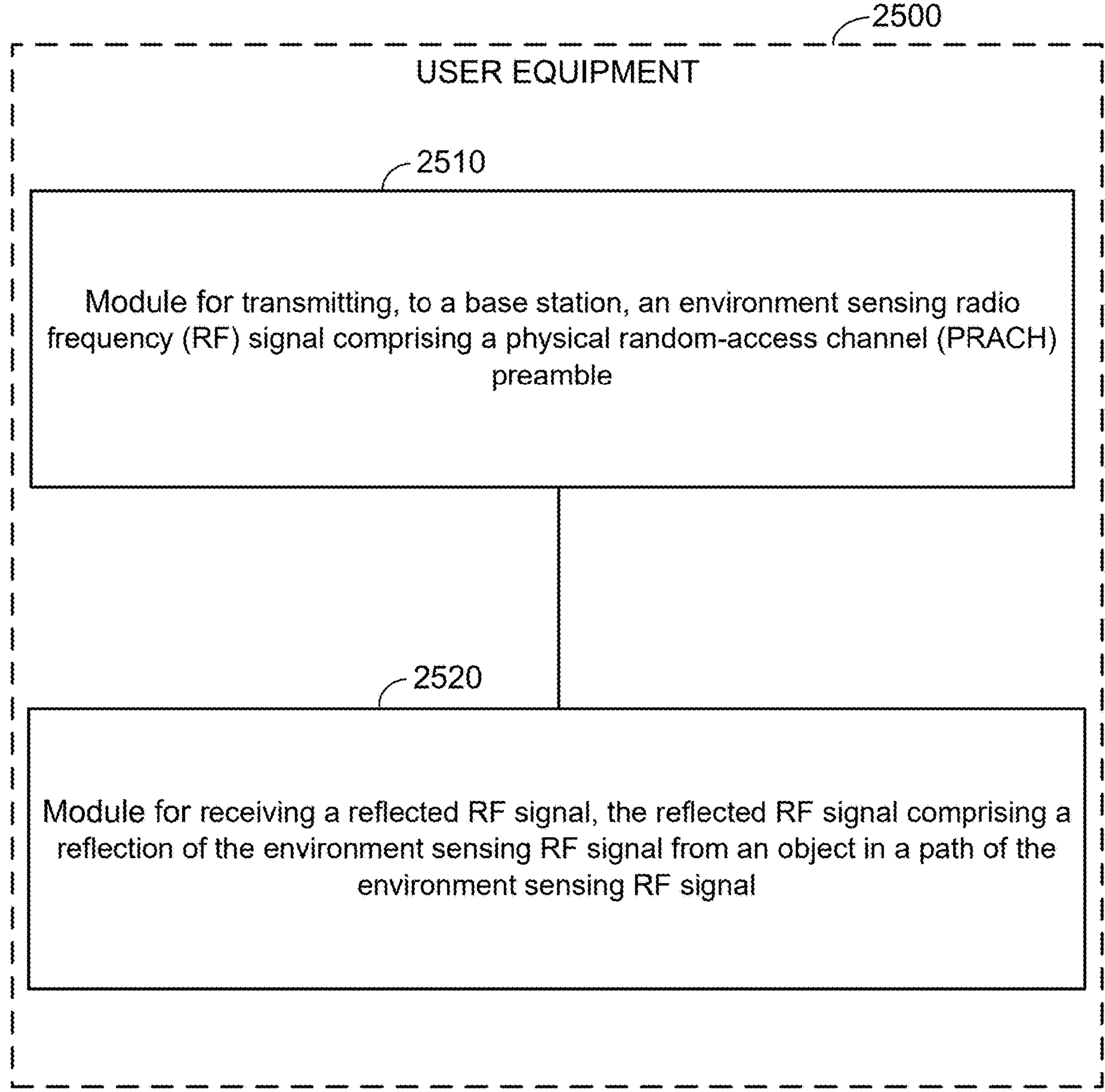

FIG. 25 illustrates an example user equipment 2500 represented as a series of interrelated functional modules. The user equipment 2500 may include a module for transmitting 2510 and a module for receiving 2520. In an aspect, the module for transmitting 2510 may correspond to sensing component 333, wireless communication device 330, processing system 310, and/or working memory 335, and the module for receiving 2520 may correspond to sensing component 333, wireless communication device 330, processing system 310, and/or working memory 335.

The functionality of the modules of FIGS. 24 and 25 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 24 and 25, as well as other components and functions described herein, may be implemented using any suitable means. Such means also may be implemented, at least in part, using corresponding structure as taught herein. For example, the components described above in conjunction with the "module for" components of FIGS. 24 and 25 also may correspond to similarly designated "means for" functionality. Thus, in some aspects one or more of such means may be implemented using one or more of processor components, integrated circuits, or other suitable structure as taught herein.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a compact disk ROM (CD-ROM), or any other form of storage medium known in the art. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of environment sensing performed by an electronic device, comprising: configuring one or more transmission parameters for an environment sensing radio frequency (RF) signal based on one or more factors, the environment sensing RF signal comprising an RF signal configured to transmit information on orthogonal frequency division multiplexing (OFDM) symbols; and transmitting the environment sensing RF signal in accordance with the one or more transmission parameters.

Clause 2. The method of clause 1, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 3. The method of clause 2, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the electronic device, or any combination thereof.

Clause 4. The method of any of clauses 2 to 3, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the electronic device, or any combination thereof.

Clause 5. The method of any of clauses 2 to 4, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the electronic device, an amount of time and frequency resources allocated to the environment sensing RF signal, or any combination thereof.

Clause 6. The method of any of clauses 2 to 5, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the electronic device configured to transmit the environment sensing RF signal, or any combination thereof.

Clause 7. The method of any of clauses 1 to 6, wherein the environment sensing RF signal comprises an RF signal configured in accordance with a Fifth Generation (5G) New Radio (NR) wireless communications standard.

Clause 8. The method of any of clauses 1 to 6, wherein the environment sensing RF signal comprises an RF signal configured in accordance with an Institute of Electrical and Electronics Engineers (IEEE) wireless communications standard.

Clause 9. The method of any of clauses 1 to 8, wherein the environment sensing RF signal is in a 60 gigahertz (GHz) frequency band, a millimeter wave (mmW) frequency band, or a terahertz (THz) frequency band.

Clause 10. The method of any of clauses 1 to 9, wherein: the electronic device is a user equipment (UE), and the UE transmits the environment sensing RF signal to a base station during a communication session with the base station.

Clause 11. The method of any of clauses 1 to 9, wherein: the electronic device is a base station, and the base station transmits the environment sensing RF signal to a user equipment (UE) during a communication session with the UE.

Clause 12. The method of any of clauses 1 to 9, wherein: the electronic device is a first user equipment (UE), and the first UE transmits the environment sensing RF signal to a second UE during a communication session with the second UE over a sidelink communication link.

Clause 13. The method of any of clauses 1 to 12, further comprising: receiving a reflected RF signal, the reflected RF signal comprising a reflection of the environment sensing RF signal from an object in a path of the environment sensing RF signal.

Clause 14. The method of clause 13, further comprising: classifying the object based on the reflected RF signal; classifying a motion state of the object based on the reflected RF signal; or classifying both the object and the motion state of the object based on the reflected RF signal.

Clause 15. An apparatus comprising a memory, communication device, and at least one processor coupled to the memory and the communication device, the memory, the communication device, and the at least one processor configured to perform a method according to any of clauses 1 to 14.

Clause 16. An apparatus comprising means for performing a method according to any of clauses 1 to 14.

Clause 17. A non-transitory computer-readable medium storing computer-executable instructions, the computer-executable comprising at least one instruction for causing a computer or processor to perform a method according to any of clauses 1 to 14.

Clause 18. A method of environment sensing performed by an electronic device, comprising: transmitting an environment sensing radio frequency (RF) signal on one or more time and/or frequency resources, the environment sensing RF signal configured on the one or more time and/or frequency resources according to a wireless communications standard; and receiving a reflected RF signal, the reflected RF signal comprising a reflection of the environment sensing RF signal from an object in a path of the environment sensing RF signal.

Clause 19. The method of clause 18, wherein the environment sensing RF signal carries information on one or more orthogonal frequency division multiplexing (OFDM) symbols.

Clause 20. The method of clause 19, wherein the one or more OFDM symbols are configured for transmission of a sounding reference signal (SRS), a physical uplink control channel (PUCCH), or a physical uplink shared channel (PUSCH).

Clause 21. The method of clause 19, wherein the one or more OFDM symbols are configured for transmission of a positioning reference signal (PRS), a physical downlink control channel (PDCCH), or a physical downlink shared channel (PDSCH).

Clause 22. The method of clause 18, wherein the environment sensing RF signal comprises a physical random-access channel (PRACH) preamble.

Clause 23. The method of clause 22, wherein the electronic device receives the reflected RF signal only when the electronic device is in a radio resource control (RRC) idle state or an RRC inactive state.

Clause 24. The method of clause 22, wherein the electronic device receives the reflected RF signal when the electronic device is in an RRC connected state.

Clause 25. The method of clause 22, wherein the electronic device receives the reflected RF signal only when the electronic device is within a configured pattern, and wherein the configured pattern comprises a time multiplexing pattern, or a combination of an RRC idle state or RRC inactivate or RRC connected state.

Clause 26. The method of any of clauses 18 to 25, further comprising: receiving a transmission configuration of the one or more time and/or frequency resources for the environment sensing RF signal.

Clause 27. The method of clause 26, wherein the electronic device receives the transmission configuration from a serving base station based on the electronic device being a user equipment (UE).

Clause 28. The method of clause 26, wherein the electronic device receives the transmission configuration from a network entity based on the electronic device being a base station.

Clause 29. The method of any of clauses 26 to 28, wherein the transmission configuration includes an indication that the one or more time and/or frequency resources are to be used for the environment sensing RF signal.

Clause 30. The method of any of clauses 26 to 29, wherein the transmission configuration indicates that: the environment sensing RF signal is to be transmitted with a larger bandwidth than RF signals configured for wireless communications according to the wireless communications standard, the environment sensing RF signal is to be transmitted at a lower transmit power than RF signals configured for wireless communications according to the wireless communications standard, the environment sensing RF signal is to be transmitted with a higher density time-division duplex (TDD) pattern than RF signals configured for wireless communications according to the wireless communications standard, the environment sensing RF signal is a repetition of an RF signal configured for wireless communications according to the wireless communications standard, or any combination thereof.

Clause 31. The method of any of clauses 26 to 30, further comprising: transmitting a request to be configured with time and/or frequency resources for the environment sensing RF signal, wherein the electronic device receives the transmission configuration in response to the request.

Clause 32. The method of clause 31, wherein the electronic device transmits the request to a serving base station based on the electronic device being a user equipment (UE).

Clause 33. The method of any of clauses 31 to 32, wherein the electronic device transmits the request to a network entity based on the electronic device being a base station.

Clause 34. The method of any of clauses 31 to 33, wherein the transmission configuration includes an indication that the one or more time and/or frequency resources are to be used for the environment sensing RF signal.

Clause 35. The method of any of clauses 31 to 34, wherein the transmission configuration includes an indication that the one or more time and/or frequency resources are to be used for the environment sensing RF signal and for communication according to the wireless communications standard.

Clause 36. The method of any of clauses 18 to 35, wherein the wireless communications standard is a Fifth Generation (5G) New Radio (NR) wireless communications standard.

Clause 37. The method of any of clauses 18 to 35, wherein the wireless communications standard is an Institute of Electrical and Electronics Engineers (IEEE) wireless communications standard.

Clause 38. The method of clause 37, wherein the environment sensing RF signal is in a 60 gigahertz (GHz) frequency band, a terahertz (THz) frequency band, or a millimeter wave (mmW) frequency band.

Clause 39. The method of any of clauses 18 to 38, wherein: the electronic device is a user equipment (UE), and the UE transmits the environment sensing RF signal to a base station during a communication session with the base station.

Clause 40. The method of clause 39, further comprising: transmitting a capability report to the base station, the capability report indicating a capability of the UE to use environment sensing RF signals configured according to the wireless communications standard for environment sensing.

Clause 41. The method of clause 40, wherein: the capability of the UE is related to a hardware constraint of the UE to support environment sensing, or the capability of the UE is related to an environment sensing level of the UE.

Clause 42. The method of any of clauses 18 to 38, wherein: the electronic device is a base station, and the base station transmits the environment sensing RF signal to a user equipment (UE) during a communication session with the UE.

Clause 43. The method of any of clauses 18 to 38, wherein: the electronic device is a first user equipment (UE), and the first UE transmits the environment sensing RF signal to a second UE during a communication session with the second UE over a sidelink communication link.

Clause 44. The method of any of clauses 18 to 43, further comprising: classifying the object based on the reflected RF signal; classifying a motion state of the object based on the reflected RF signal; or classifying both the object and the motion state of the object based on the reflected RF signal.

Clause 45. An apparatus comprising a memory, communication device, and at least one processor coupled to the memory and the communication device, the memory, the communication device, and the at least one processor configured to perform a method according to any of clauses 18 to 44.

Clause 46. An apparatus comprising means for performing a method according to any of clauses 18 to 44.

Clause 47. A non-transitory computer-readable medium storing computer-executable instructions, the computer-executable comprising at least one instruction for causing a computer or processor to perform a method according to any of clauses 18 to 44.

Clause 48. A method of environment sensing performed by a user equipment (UE), comprising: receiving one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and transmitting the environment sensing RF signal in accordance with the one or more transmission parameters.

Clause 49. The method of clause 48, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 50. The method of clause 49, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the UE, or any combination thereof.

Clause 51. The method of any of clauses 49 to 50, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the UE, or any combination thereof.

Clause 52. The method of any of clauses 49 to 51, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the UE, an amount of time and frequency resources allocated to the environment sensing RF signal, or any combination thereof.

Clause 53. The method of any of clauses 49 to 52, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the UE, or any combination thereof.

Clause 54. The method of any of clauses 48 to 53, wherein the environment sensing RF signal comprises an RF signal configured in accordance with a Fifth Generation (5G) New Radio (NR) wireless communications standard.

Clause 55. The method of any of clauses 48 to 53, wherein the environment sensing RF signal comprises an RF signal configured in accordance with an Institute of Electrical and Electronics Engineers (IEEE) wireless communications standard.

Clause 56. The method of any of clauses 48 to 55, wherein the environment sensing RF signal is in a 60 gigahertz (GHz) frequency band, a millimeter wave (mmW) frequency band, or a terahertz (THz) frequency band.

Clause 57. The method of any of clauses 48 to 56, wherein: the one or more transmission parameters are received from a base station, and the environment sensing RF signal is transmitted to the base station during a communication session with the base station.

Clause 58. The method of any of clauses 48 to 56, wherein the environment sensing RF signal is transmitted to a second UE during a communication session with the second UE over a sidelink communication link.

Clause 59. The method of any of clauses 48 to 58, further comprising: receiving a reflected RF signal, the reflected RF signal comprising a reflection of the environment sensing RF signal from an object in a path of the environment sensing RF signal.

Clause 60. The method of clause 59, further comprising: classifying the object based on the reflected RF signal; classifying a motion state of the object based on the reflected RF signal; or classifying both the object and the motion state of the object based on the reflected RF signal.

Clause 61. A method of environment sensing performed by a base station, comprising: transmitting, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and receiving the environment sensing RF signal from the UE.

Clause 62. The method of clause 61, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 63. The method of clause 62, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the UE, or any combination thereof.

Clause 64. The method of any of clauses 62 to 63, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the UE, or any combination thereof.

Clause 65. The method of any of clauses 62 to 64, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the UE, an amount of time and frequency resources allocated to the environment sensing RF signal, or any combination thereof.

Clause 66. The method of any of clauses 62 to 65, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the UE, or any combination thereof.

Clause 67. The method of any of clauses 61 to 66, wherein the environment sensing RF signal comprises an RF signal configured in accordance with a Fifth Generation (5G) New Radio (NR) wireless communications standard.

Clause 68. The method of any of clauses 61 to 66, wherein the environment sensing RF signal comprises an RF signal configured in accordance with an Institute of Electrical and Electronics Engineers (IEEE) wireless communications standard.

Clause 69. The method of any of clauses 61 to 68, wherein the environment sensing RF signal is in a 60 gigahertz (GHz) frequency band, a millimeter wave (mmW) frequency band, or a terahertz (THz) frequency band.

Clause 70. The method of any of clauses 61 to 69, further comprising: receiving a reflected RF signal, the reflected RF signal comprising a reflection of the environment sensing RF signal from an object in a path of the environment sensing RF signal.

Clause 71. The method of clause 70, further comprising: classifying the object based on the reflected RF signal; classifying a motion state of the object based on the reflected RF signal; or classifying both the object and the motion state of the object based on the reflected RF signal.

Clause 72. A method of environment sensing performed by an electronic device, comprising: transmitting an environment sensing radio frequency (RF) signal carrying information on one or more orthogonal frequency division multiplexing (OFDM) symbols; and receiving a reflected RF signal, the reflected RF signal comprising a reflection of the environment sensing RF signal from an object in a path of the environment sensing RF signal.

Clause 73. The method of clause 72, wherein the one or more OFDM symbols are configured for transmission of a sounding reference signal (SRS), a physical uplink control channel (PUCCH), or a physical uplink shared channel (PUSCH).

Clause 74. The method of clause 72, wherein the one or more OFDM symbols are configured for transmission of a positioning reference signal (PRS), a physical downlink control channel (PDCCH), or a physical downlink shared channel (PDSCH).

Clause 75. The method of any of clauses 72 to 74, further comprising: receiving a transmission configuration of the one or more OFDM symbols.

Clause 76. The method of clause 75, wherein the transmission configuration is received from a serving base station based on the electronic device being a user equipment (UE).

Clause 77. The method of any of clauses 75 to 76, wherein the transmission configuration is received from a network entity based on the electronic device being a base station.

Clause 78. The method of any of clauses 75 to 77, wherein the transmission configuration includes an indication that the one or more OFDM symbols are to be used for the environment sensing RF signal.

Clause 79. The method of any of clauses 75 to 78, wherein the transmission configuration includes an indication that the one or more OFDM symbols are to be used for the environment sensing RF signal and for wireless communication.

Clause 80. The method of any of clauses 75 to 79, wherein the transmission configuration indicates that: the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

Clause 81. The method of any of clauses 75 to 80, further comprising: transmitting a request to be configured with time and/or frequency resources for the environment sensing RF signal, wherein the transmission configuration is received in response to the request.

Clause 82. The method of clause 81, wherein the request is transmitted to a serving base station based on the electronic device being a user equipment (UE).

Clause 83. The method of clause 81, wherein the request is transmitted to a network entity based on the electronic device being a base station.

Clause 84. The method of any of clauses 72 to 83, wherein the one or more OFDM symbols are configured according to a Fifth Generation (5G) New Radio (NR) wireless communications standard.

Clause 85. The method of any of clauses 72 to 84, wherein the environment sensing RF signal is in a 60 gigahertz (GHz) frequency band, a terahertz (THz) frequency band, or a millimeter wave (mmW) frequency band.

Clause 86. The method of any of clauses 72 to 85, wherein: the electronic device is a user equipment (UE), and the environment sensing RF signal is transmitted to a base station during a communication session with the base station.

Clause 87. The method of clause 86, further comprising: transmitting a capability report to the base station, the capability report indicating a capability of the UE to use environment sensing RF signals carrying information on OFDM symbols.

Clause 88. The method of clause 87, wherein: the capability of the UE is related to a hardware constraint of the UE to support environment sensing, or the capability of the UE is related to an environment sensing level of the UE.

Clause 89. The method of any of clauses 72 to 85, wherein: the electronic device is a base station, and the environment sensing RF signal is transmitted to a user equipment (UE) during a communication session with the UE.

Clause 90. The method of any of clauses 72 to 85, wherein: the electronic device is a first user equipment (UE), and the environment sensing RF signal is transmitted to a second UE during a communication session with the second UE over a sidelink communication link.

Clause 91. The method of any of clauses 72 to 90, further comprising: classifying the object based on the reflected RF signal; classifying a motion state of the object based on the reflected RF signal; or classifying both the object and the motion state of the object based on the reflected RF signal.

Clause 92. A method of environment sensing performed by a user equipment (UE), comprising: transmitting, to a base station, an environment sensing radio frequency (RF) signal comprising a physical random-access channel (PRACH) preamble; and receiving a reflected RF signal, the reflected RF signal comprising a reflection of the environment sensing RF signal from an object in a path of the environment sensing RF signal.

Clause 93. The method of clause 92, wherein the reflected RF signal is received when the UE is in a radio resource control (RRC) idle state or an RRC inactive state.

Clause 94. The method of clause 92, wherein the reflected RF signal is received when the UE is in an RRC connected state.

Clause 95. The method of any of clauses 92 to 94, wherein: the reflected RF signal is received when the UE is within a configured pattern, and the configured pattern comprises a time multiplexing pattern, or a combination of an RRC idle state or RRC inactivate or RRC connected state.

Clause 96. The method of any of clauses 92 to 95, further comprising: receiving, from the base station, a transmission configuration of the PRACH preamble.

Clause 97. The method of clause 96, wherein the transmission configuration includes an indication that the PRACH preamble is to be used for the environment sensing RF signal.

Clause 98. The method of any of clauses 96 to 97, wherein the transmission configuration includes an indication that the PRACH preamble is to be used for the environment sensing RF signal and for wireless communication.

Clause 99. The method of any of clauses 96 to 98, wherein the transmission configuration indicates that: the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

Clause 100. The method of any of clauses 96 to 99, further comprising: transmitting, to the base station, a request to be configured with time and/or frequency resources for the environment sensing RF signal, wherein the transmission configuration is received in response to the request.

Clause 101. The method of any of clauses 92 to 100, wherein the PRACH preamble is configured according to a Fifth Generation (5G) New Radio (NR) wireless communications standard.

Clause 102. The method of any of clauses 92 to 101, wherein the environment sensing RF signal is in a 60 gigahertz (GHz) frequency band, a terahertz (THz) frequency band, or a millimeter wave (mmW) frequency band.

Clause 103. The method of any of clauses 92 to 102, further comprising: transmitting a capability report to the base station, the capability report indicating a capability of the UE to use PRACH preambles as environment sensing RF signals.

Clause 104. The method of clause 103, wherein: the capability of the UE is related to a hardware constraint of the UE to support environment sensing, or the capability of the UE is related to an environment sensing level of the UE.

Clause 105. The method of any of clauses 92 to 104, further comprising: classifying the object based on the reflected RF signal; classifying a motion state of the object based on the reflected RF signal; or classifying both the object and the motion state of the object based on the reflected RF signal.

Clause 106. An apparatus comprising a memory and at least one processor coupled to the memory, the memory and the at least one processor configured to perform a method according to any of clauses 48 to 105.

Clause 107. An apparatus comprising means for performing a method according to any of clauses 48 to 105.

Clause 108. A non-transitory computer-readable medium storing computer-executable instructions, the computer-executable comprising at least one instruction for causing a computer or processor to perform a method according to any of clauses 48 to 105.

Implementation examples related to the user equipment 1200 are described in the following numbered clauses:

Clause 109. The memory 1210 and the at least one processor 1230 are configured to receive, via the communication device 1220, one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols. The memory 1210 and the at least one processor 1230 are further configured to cause the communication device 1220 to transmit the environment sensing RF signal in accordance with the one or more transmission parameters.

Clause 110. The user equipment 1200 of clause 109, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 111. The user equipment 1200 of clause 110, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the user equipment 1200, or any combination thereof.

Clause 112. The user equipment 1200 of any of clauses 110 to 111, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the user equipment 1200, or any combination thereof.

Clause 113. The user equipment 1200 of any of clauses 110 to 112, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the user equipment 1200, an amount of time and frequency resources allocated to the environment sensing RF signal, or any combination thereof.

Clause 114. The user equipment 1200 of any of clauses 110 to 113, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the user equipment 1200, or any combination thereof.

Clause 115. The user equipment 1200 of any of clauses 109 to 114, wherein the environment sensing RF signal comprises an RF signal configured in accordance with a Fifth Generation (5G) New Radio (NR) wireless communications standard.

Clause 116. The user equipment 1200 of any of clauses 109 to 114, wherein the environment sensing RF signal comprises an RF signal configured in accordance with an Institute of Electrical and Electronics Engineers (IEEE) wireless communications standard.

Clause 117. The user equipment 1200 of any of clauses 109 to 116, wherein the environment sensing RF signal is in a 60 gigahertz (GHz) frequency band, a millimeter wave (mmW) frequency band, or a terahertz (THz) frequency band.

Clause 118. The user equipment 1200 of any of clauses 109 to 117, wherein: the one or more transmission parameters are received from a base station, and the environment sensing RF signal is transmitted to the base station during a communication session with the base station.

Clause 119. The user equipment 1200 of any of clauses 109 to 117, wherein the environment sensing RF signal is transmitted to a second UE during a communication session with the second UE over a sidelink communication link.

Clause 120. The user equipment 1200 of any of clauses 109 to 119, wherein the memory 1210 and the at least one processor 1230 are further configured to receive, via the communication device 1220, a reflected RF signal, the reflected RF signal comprising a reflection of the environment sensing RF signal from an object in a path of the environment sensing RF signal.

Clause 121. The user equipment 1200 of clause 120, wherein the memory 1210 and the at least one processor 1230 are further configured to: classify the object based on the reflected RF signal; classify a motion state of the object based on the reflected RF signal; or classify both the object and the motion state of the object based on the reflected RF signal.

Implementation examples related to the base station 1300 are described in the following numbered clauses:

Clause 122. The memory 1310 and the at least one processor 1330 are configured to cause the communication device 1320 to transmit, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols. The memory 1310 and the at least one processor 1330 are further configured to receive, via the communication device 1320, the environment sensing RF signal from the UE.

Clause 123. The base station 1300 of clause 122, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 124. The base station 1300 of clause 123, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the UE, or any combination thereof.

Clause 125. The base station 1300 of any of clauses 123 to 124, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the UE, or any combination thereof.

Clause 126. The base station 1300 of any of clauses 123 to 125, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the UE, an amount of time and frequency resources allocated to the environment sensing RF signal, or any combination thereof.

Clause 127. The base station 1300 of any of clauses 123 to 126, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the UE, or any combination thereof.

Clause 128. The base station 1300 of any of clauses 122 to 127, wherein the environment sensing RF signal comprises an RF signal configured in accordance with a Fifth Generation (5G) New Radio (NR) wireless communications standard.

Clause 129. The base station 1300 of any of clauses 122 to 127, wherein the environment sensing RF signal comprises an RF signal configured in accordance with an Institute of Electrical and Electronics Engineers (IEEE) wireless communications standard.

Clause 130. The base station 1300 of any of clauses 122 to 129, wherein the environment sensing RF signal is in a 60 gigahertz (GHz) frequency band, a millimeter wave (mmW) frequency band, or a terahertz (THz) frequency band.

Clause 131. The base station 1300 of any of clauses 122 to 130, wherein the memory 1310 and the at least one processor 1330 are further configured to receive, via the communication device 1320, a reflected RF signal, the reflected RF signal comprising a reflection of the environment sensing RF signal from an object in a path of the environment sensing RF signal.

Clause 132. The base station 1300 of clause 131, wherein the memory 1310 and the at least one processor 1330 are further configured to: classify the object based on the reflected RF signal; classify a motion state of the object based on the reflected RF signal; or classify both the object and the motion state of the object based on the reflected RF signal.

Implementation examples related to the user equipment 1400 are described in the following numbered clauses:

Clause 133. The module for receiving 1410 provides means for receiving one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols. The module for transmitting 1420 provides means for transmitting the environment sensing RF signal in accordance with the one or more transmission parameters.

Clause 134. The user equipment 1400 of clause 133, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 135. The user equipment 1400 of clause 134, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the UE, or any combination thereof.

Clause 136. The user equipment 1400 of any of clauses 134 to 135, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the UE, or any combination thereof.

Clause 137. The user equipment 1400 of any of clauses 134 to 136, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the user equipment 1400, an amount of time and frequency resources allocated to the environment sensing RF signal, or any combination thereof.

Clause 138. The user equipment 1400 of any of clauses 134 to 137, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the UE, or any combination thereof.

Clause 139. The user equipment 1400 of any of clauses 133 to 138, wherein the environment sensing RF signal comprises an RF signal configured in accordance with a Fifth Generation (5G) New Radio (NR) wireless communications standard.

Clause 140. The user equipment 1400 of any of clauses 133 to 138, wherein the environment sensing RF signal comprises an RF signal configured in accordance with an Institute of Electrical and Electronics Engineers (IEEE) wireless communications standard.

Clause 141. The user equipment 1400 of any of clauses 133 to 140, wherein the environment sensing RF signal is in a 60 gigahertz (GHz) frequency band, a millimeter wave (mmW) frequency band, or a terahertz (THz) frequency band.

Clause 142. The user equipment 1400 of any of clauses 133 to 141, wherein: the one or more transmission parameters are received from a base station, and the environment sensing RF signal is transmitted to the base station during a communication session with the base station.

Clause 143. The user equipment 1400 of any of clauses 133 to 141, wherein the environment sensing RF signal is transmitted to a second UE during a communication session with the second UE over a sidelink communication link.

Clause 144. The user equipment 1400 of any of clauses 133 to 143, further comprising: means for receiving a reflected RF signal, the reflected RF signal comprising a reflection of the environment sensing RF signal from an object in a path of the environment sensing RF signal.

Clause 145. The user equipment 1400 of clause 144, further comprising: means for classifying the object based on the reflected RF signal; means for classify a motion state of the object based on the reflected RF signal; or means for classifying both the object and the motion state of the object based on the reflected RF signal.

Implementation examples related to the base station 1500 are described in the following numbered clauses:

Clause 146. The module for transmitting 1510 provides means for transmitting, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols. The module for receiving 1520 provides means for receiving the environment sensing RF signal from the UE.

Clause 147. The base station 1500 of clause 146, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

Clause 148. The base station 1500 of clause 147, wherein: the one or more transmission parameters comprise at least the power control for the environment sensing RF signal, and the one or more factors comprise: a sensing granularity to be provided by the environment sensing RF signal, an amount of interference permitted for the environment sensing RF signal, a type of application for which the environment sensing RF signal is being transmitted, a transmission power permitted to the UE, or any combination thereof.

Clause 149. The base station 1500 of any of clauses 147 to 148, wherein: the one or more transmission parameters comprise at least the bandwidth configuration for the environment sensing RF signal, and the one or more factors comprise: a sensing range resolution to be provided by the environment sensing RF signal, a type of application for which the environment sensing RF signal is being transmitted, a maximum bandwidth capability of the UE, or any combination thereof.

Clause 150. The base station 1500 of any of clauses 147 to 149, wherein: the one or more transmission parameters comprise at least the time duration configuration for the environment sensing RF signal, and the one or more factors comprise: a sensing Doppler resolution to be provided by the environment sensing RF signal, a type of application for which the environment sensing RF signal is being transmitted, a Doppler computation capability of the UE, an amount of time and frequency resources allocated to the environment sensing RF signal, or any combination thereof.

Clause 151. The base station 1500 of any of clauses 147 to 150, wherein: the one or more transmission parameters comprise at least the antenna configuration for the environment sensing RF signal, and the one or more factors comprise: a sensing angular resolution to be provided by the environment sensing RF signal, a type of application for which the environment sensing RF signal is being transmitted, a size of an antenna array of the UE, or any combination thereof.

Clause 152. The base station 1500 of any of clauses 146 to 151, wherein the environment sensing RF signal comprises an RF signal configured in accordance with a Fifth Generation (5G) New Radio (NR) wireless communications standard.

Clause 153. The base station 1500 of any of clauses 146 to 151, wherein the environment sensing RF signal comprises an RF signal configured in accordance with an Institute of Electrical and Electronics Engineers (IEEE) wireless communications standard.

Clause 154. The base station 1500 of any of clauses 146 to 153, wherein the environment sensing RF signal is in a 60 gigahertz (GHz) frequency band, a millimeter wave (mmW) frequency band, or a terahertz (THz) frequency band.

Clause 155. The base station 1500 of any of clauses 146 to 154, further comprising: means for receiving a reflected RF signal, the reflected RF signal comprising a reflection of the environment sensing RF signal from an object in a path of the environment sensing RF signal.

Clause 156. The base station 1500 of clause 155, further comprising: means for classifying the object based on the reflected RF signal; means for classifying a motion state of the object based on the reflected RF signal; or means for classifying both the object and the motion state of the object based on the reflected RF signal.

Implementation examples related to the electronic device 2200 are described in the following numbered clauses:

Clause 157. The memory 2210 and the at least one processor 2230 are configured to cause the communication device 2220 to transmit an environment sensing radio frequency (RF) signal carrying information on one or more orthogonal frequency division multiplexing (OFDM) symbols. The memory 2210 and the at least one processor 2230 are further configured to receive, via the communication device 2220, a reflected RF signal, the reflected RF signal comprising a reflection of the environment sensing RF signal from an object in a path of the environment sensing RF signal.

Clause 158. The electronic device 2200 of clause 157, wherein the one or more OFDM symbols are configured for transmission of a sounding reference signal (SRS), a physical uplink control channel (PUCCH), or a physical uplink shared channel (PUSCH).

Clause 159. The electronic device 2200 of clause 157, wherein the one or more OFDM symbols are configured for transmission of a positioning reference signal (PRS), a physical downlink control channel (PDCCH), or a physical downlink shared channel (PDSCH).

Clause 160. The electronic device 2200 of any of clauses 157 to 159, wherein the memory 2210 and the at least one processor 2230 are further configured to receive, via the communication device 2220, a transmission configuration of the one or more OFDM symbols.

Clause 161. The electronic device 2200 of clause 160, wherein the transmission configuration is received from a serving base station based on the electronic device 2200 being a user equipment (UE).

Clause 162. The electronic device 2200 of clause 160, wherein the transmission configuration is received from a network entity based on the electronic device 2200 being a base station.

Clause 163. The electronic device 2200 of any of clauses 160 to 162, wherein the transmission configuration includes an indication that the one or more OFDM symbols are to be used for the environment sensing RF signal.

Clause 164. The electronic device 2200 of any of clauses 160 to 163, wherein the transmission configuration includes an indication that the one or more OFDM symbols are to be used for the environment sensing RF signal and for wireless communication.

Clause 165. The electronic device 2200 of any of clauses 160 to 164, wherein the transmission configuration indicates that: the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

Clause 166. The electronic device 2200 of any of clauses 160 to 165, wherein the memory 2210 and the at least one processor 2230 are further configured to cause the communication device 2220 to transmit a request to be configured with time and/or frequency resources for the environment sensing RF signal, wherein the transmission configuration is received in response to the request.

Clause 167. The electronic device 2200 of clause 166, wherein the request is transmitted to a serving base station based on the electronic device 2200 being a user equipment (UE).

Clause 168. The electronic device 2200 of clause 166, wherein the request is transmitted to a network entity based on the electronic device 2200 being a base station.

Clause 169. The electronic device 2200 of any of clauses 157 to 168, wherein the one or more OFDM symbols are configured according to a Fifth Generation (5G) New Radio (NR) wireless communications standard.

Clause 170. The electronic device 2200 of any of clauses 157 to 169, wherein the environment sensing RF signal is in a 60 gigahertz (GHz) frequency band, a terahertz (THz) frequency band, or a millimeter wave (mmW) frequency band.

Clause 171. The electronic device 2200 of any of clauses 157 to 170, wherein: the electronic device 2200 is a user equipment (UE), and the environment sensing RF signal is transmitted to a base station during a communication session with the base station.

Clause 172. The electronic device 2200 of clause 171, wherein the memory 2210 and the at least one processor 2230 are further configured to cause the communication device 2220 to transmit a capability report to the base station, the capability report indicating a capability of the UE to use environment sensing RF signals carrying information on OFDM symbols.

Clause 173. The electronic device 2200 of clause 172, wherein: the capability of the UE is related to a hardware constraint of the UE to support environment sensing, or the capability of the UE is related to an environment sensing level of the UE.

Clause 174. The electronic device 2200 of any of clauses 157 to 170, wherein: the electronic device 2200 is a base station, and the environment sensing RF signal is transmitted to a user equipment (UE) during a communication session with the UE.

Clause 175. The electronic device 2200 of any of clauses 157 to 170, wherein: the electronic device 2200 is a first user equipment (UE), and the environment sensing RF signal is transmitted to a second UE during a communication session with the second UE over a sidelink communication link.

Clause 176. The electronic device 2200 of any of clauses 157 to 175, wherein the memory 2210 and the at least one processor 2230 are further configured to: classify the object based on the reflected RF signal; classify a motion state of the object based on the reflected RF signal; or classify both the object and the motion state of the object based on the reflected RF signal.

Implementation examples related to the user equipment 2300 are described in the following numbered clauses:

Clause 177. The memory 2310 and the at least one processor 2330 are configured to cause the communication device 2320 to transmit, to a base station, an environment sensing radio frequency (RF) signal comprising a physical random-access channel (PRACH) preamble. The memory 2310 and the at least one processor 2330 are further configured to receive, via the communication device 2320, a reflected RF signal, the reflected RF signal comprising a reflection of the environment sensing RF signal from an object in a path of the environment sensing RF signal.

Clause 178. The user equipment 2300 of clause 177, wherein the reflected RF signal is received when the user equipment 2300 is in a radio resource control (RRC) idle state or an RRC inactive state.

Clause 179. The user equipment 2300 of clause 177, wherein the reflected RF signal is received when the user equipment 2300 is in an RRC connected state.

Clause 180. The user equipment 2300 of clause 177, wherein: the reflected RF signal is received when the user equipment 2300 is within a configured pattern, and the configured pattern comprises a time multiplexing pattern, or a combination of an RRC idle state or RRC inactivate or RRC connected state.

Clause 181. The user equipment 2300 of any of clauses 177 to 180, wherein the memory 2310 and the at least one processor 2330 are further configured to receive, from the base station, via the communication device 2320, a transmission configuration of the PRACH preamble.

Clause 182. The user equipment 2300 of clause 181, wherein the transmission configuration includes an indication that the PRACH preamble is to be used for the environment sensing RF signal.

Clause 183. The user equipment 2300 of any of clauses 181 to 182, wherein the transmission configuration includes an indication that the PRACH preamble is to be used for the environment sensing RF signal and for wireless communication.

Clause 184. The user equipment 2300 of any of clauses 181 to 183, wherein the transmission configuration indicates that: the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

Clause 185. The user equipment 2300 of any of clauses 181 to 184, wherein the memory 2310 and the at least one processor 2330 are further configured to cause the communication device 2320 to transmit, to the base station, a request to be configured with time and/or frequency resources for the environment sensing RF signal, wherein the transmission configuration is received in response to the request.

Clause 186. The user equipment 2300 of any of clauses 177 to 185, wherein the PRACH preamble is configured according to a Fifth Generation (5G) New Radio (NR) wireless communications standard.

Clause 187. The user equipment 2300 of any of clauses 177 to 186, wherein the environment sensing RF signal is in a 60 gigahertz (GHz) frequency band, a terahertz (THz) frequency band, or a millimeter wave (mmW) frequency band.

Clause 188. The user equipment 2300 of any of clauses 177 to 187, wherein the memory 2310 and the at least one processor 2330 are further configured to cause the communication device 2320 to transmit a capability report to the base station, the capability report indicating a capability of the user equipment 2300 to use PRACH preambles as environment sensing RF signals.

Clause 189. The user equipment 2300 of clause 188, wherein: the capability of the user equipment 2300 is related to a hardware constraint of the user equipment 2300 to support environment sensing, or the capability of the user equipment 2300 is related to an environment sensing level of the user equipment 2300.

Clause 190. The user equipment 2300 of any of clauses 177 to 189, wherein the memory 2310 and the at least one processor 2330 are further configured to: classify the object based on the reflected RF signal; classify a motion state of the object based on the reflected RF signal; or classify both the object and the motion state of the object based on the reflected RF signal.

Implementation examples related to the electronic device 2400 are described in the following numbered clauses:

Clause 191. The module for transmitting 2410 provides means for transmitting an environment sensing radio frequency (RF) signal carrying information on one or more orthogonal frequency division multiplexing (OFDM) symbols. The module for receiving 2420 provides means for receiving a reflected RF signal, the reflected RF signal comprising a reflection of the environment sensing RF signal from an object in a path of the environment sensing RF signal.

Clause 192. The electronic device 2400 of clause 191, wherein the one or more OFDM symbols are configured for transmission of a sounding reference signal (SRS), a physical uplink control channel (PUCCH), or a physical uplink shared channel (PUSCH).

Clause 193. The electronic device 2400 of clause 191, wherein the one or more OFDM symbols are configured for transmission of a positioning reference signal (PRS), a physical downlink control channel (PDCCH), or a physical downlink shared channel (PDSCH).

Clause 194. The electronic device 2400 of any of clauses 191 to 193, further comprising: means for receiving a transmission configuration of the one or more OFDM symbols.

Clause 195. The electronic device 2400 of clause 194, wherein the transmission configuration is received from a serving base station based on the electronic device 2400 being a user equipment (UE).

Clause 196. The electronic device 2400 of clause 194, wherein the transmission configuration is received from a network entity based on the electronic device 2400 being a base station.

Clause 197. The electronic device 2400 of any of clauses 194 to 196, wherein the transmission configuration includes an indication that the one or more OFDM symbols are to be used for the environment sensing RF signal.

Clause 198. The electronic device 2400 of any of clauses 194 to 197, wherein the transmission configuration includes an indication that the one or more OFDM symbols are to be used for the environment sensing RF signal and for wireless communication.

Clause 199. The electronic device 2400 of any of clauses 194 to 198, wherein the transmission configuration indicates that: the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

Clause 200. The electronic device 2400 of any of clauses 194 to 199, further comprising: means for transmitting a request to be configured with time and/or frequency resources for the environment sensing RF signal, wherein the transmission configuration is received in response to the request.

Clause 201. The electronic device 2400 of clause 200, wherein the request is transmitted to a serving base station based on the electronic device 2400 being a user equipment (UE).

Clause 202. The electronic device 2400 of clause 200, wherein the request is transmitted to a network entity based on the electronic device 2400 being a base station.

Clause 203. The electronic device 2400 of any of clauses 191 to 202, wherein the one or more OFDM symbols are configured according to a Fifth Generation (5G) New Radio (NR) wireless communications standard.

Clause 204. The electronic device 2400 of any of clauses 191 to 203, wherein the environment sensing RF signal is in a 60 gigahertz (GHz) frequency band, a terahertz (THz) frequency band, or a millimeter wave (mmW) frequency band.

Clause 205. The electronic device 2400 of any of clauses 191 to 204, wherein: the electronic device 2400 is a user equipment (UE), and the environment sensing RF signal is transmitted to a base station during a communication session with the base station.

Clause 206. The electronic device 2400 of clause 205, further comprising: means for transmitting a capability report to the base station, the capability report indicating a capability of the UE to use environment sensing RF signals carrying information on OFDM symbols.

Clause 207. The electronic device 2400 of clause 206, wherein: the capability of the UE is related to a hardware constraint of the UE to support environment sensing, or the capability of the UE is related to an environment sensing level of the UE.

Clause 208. The electronic device 2400 of any of clauses 191 to 204, wherein: the electronic device 2400 is a base station, and the environment sensing RF signal is transmitted to a user equipment (UE) during a communication session with the UE.

Clause 209. The electronic device 2400 of any of clauses 191 to 204, wherein: the electronic device 2400 is a first user equipment (UE), and the environment sensing RF signal is transmitted to a second UE during a communication session with the second UE over a sidelink communication link.

Clause 210. The electronic device 2400 of any of clauses 191 to 209, further comprising: means for classifying the object based on the reflected RF signal; means for classifying a motion state of the object based on the reflected RF signal; or means for classifying both the object and the motion state of the object based on the reflected RF signal.

Implementation examples related to the user equipment 2500 are described in the following numbered clauses:

Clause 211. The module for transmitting 2510 provides means for transmitting, to a base station, an environment sensing radio frequency (RF) signal comprising a physical random-access channel (PRACH) preamble. The module for receiving 2520 provides means for receiving a reflected RF signal, the reflected RF signal comprising a reflection of the environment sensing RF signal from an object in a path of the environment sensing RF signal.

Clause 212. The user equipment 2500 of clause 211, wherein the reflected RF signal is received when the user equipment 2500 is in a radio resource control (RRC) idle state or an RRC inactive state.

Clause 213. The user equipment 2500 of clause 211, wherein the reflected RF signal is received when the user equipment 2500 is in an RRC connected state.

Clause 214. The user equipment 2500 of clause 211, wherein: the reflected RF signal is received when the user equipment 2500 is within a configured pattern, and the configured pattern comprises a time multiplexing pattern, or a combination of an RRC idle state or RRC inactivate or RRC connected state.

Clause 215. The user equipment 2500 of any of clauses 211 to 214, further comprising: means for receiving, from the base station, a transmission configuration of the PRACH preamble.

Clause 216. The user equipment 2500 of clause 215, wherein the transmission configuration includes an indication that the PRACH preamble is to be used for the environment sensing RF signal.

Clause 217. The user equipment 2500 of any of clauses 215 to 216, wherein the transmission configuration includes an indication that the PRACH preamble is to be used for the environment sensing RF signal and for wireless communication.

Clause 218. The user equipment 2500 of any of clauses 215 to 217, wherein the transmission configuration indicates that: the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

Clause 219. The user equipment 2500 of any of clauses 215 to 218, further comprising: means for transmitting, to the base station, a request to be configured with time and/or frequency resources for the environment sensing RF signal, wherein the transmission configuration is received in response to the request.

Clause 220. The user equipment 2500 of any of clauses 211 to 219, wherein the PRACH preamble is configured according to a Fifth Generation (5G) New Radio (NR) wireless communications standard.

Clause 221. The user equipment 2500 of any of clauses 211 to 220, wherein the environment sensing RF signal is in a 60 gigahertz (GHz) frequency band, a terahertz (THz) frequency band, or a millimeter wave (mmW) frequency band.

Clause 222. The user equipment 2500 of any of clauses 211 to 221, further comprising: means for transmitting a capability report to the base station, the capability report indicating a capability of the user equipment 2500 to use PRACH preambles as environment sensing RF signals.

Clause 223. The user equipment 2500 of clause 222, wherein: the capability of the user equipment 2500 is related to a hardware constraint of the user equipment 2500 to support environment sensing, or the capability of the user equipment 2500 is related to an environment sensing level of the user equipment 2500.

Clause 224. The user equipment 2500 of any of clauses 211 to 223, further comprising: means for classifying the object based on the reflected RF signal; means for classifying a motion state of the object based on the reflected RF signal; or means for classifying both the object and the motion state of the object based on the reflected RF signal.

What is claimed is:

1. A method of environment sensing performed by a user equipment (UE), comprising:

receiving one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and transmitting the environment sensing RF signal in accordance with the one or more transmission parameters, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

2. The method of claim 1, wherein:

the one or more transmission parameters comprise at least the power control for the environment sensing RF signal, and the one or more factors comprise:

a sensing granularity to be provided by the environment sensing RF signal, an amount of interference permitted for the environment sensing RF signal, a type of application for which the environment sensing RF signal is being transmitted, a transmission power permitted to the UE, or any combination thereof.

3. The method of claim 1, wherein:

the one or more transmission parameters comprise at least the bandwidth configuration for the environment sensing RF signal, and the one or more factors comprise:

a sensing range resolution to be provided by the environment sensing RF signal, a type of application for which the environment sensing RF signal is being transmitted, a maximum bandwidth capability of the UE, or any combination thereof.

4. The method of claim 1, wherein:

the one or more transmission parameters comprise at least the time duration configuration for the environment sensing RF signal, and the one or more factors comprise:

a sensing Doppler resolution to be provided by the environment sensing RF signal, a type of application for which the environment sensing RF signal is being transmitted, a Doppler computation capability of the UE, an amount of time and frequency resources allocated to the environment sensing RF signal, or any combination thereof.

5. The method of claim 1, wherein:

the one or more transmission parameters comprise at least the antenna configuration for the environment sensing RF signal, and the one or more factors comprise:

a sensing angular resolution to be provided by the environment sensing RF signal, a type of application for which the environment sensing RF signal is being transmitted, a size of an antenna array of the UE, or any combination thereof.

6. The method of claim 1, wherein the environment sensing RF signal is in a 60 gigahertz (GHz) frequency band, a millimeter wave (mmW) frequency band, or a terahertz (THz) frequency band.

7. The method of claim 1, wherein:

the one or more transmission parameters are received from a base station, and the environment sensing RF signal is transmitted to the base station during a communication session with the base station.

8. The method of claim 1, wherein the environment sensing RF signal is transmitted to a second UE during a communication session with the second UE over a sidelink communication link.

9. The method of claim 1, further comprising:

receiving a reflected RF signal, the reflected RF signal comprising a reflection of the environment sensing RF signal from an object in a path of the environment sensing RF signal.

10. The method of claim 9, further comprising:

classifying the object based on the reflected RF signal;

classifying a motion state of the object based on the reflected RF signal; or classifying both the object and the motion state of the object based on the reflected RF signal.

11. A method of environment sensing performed by a base station, comprising:

transmitting, to a user equipment (UE), one or more transmission parameters for an environment sensing radio frequency (RF) signal, the one or more transmission parameters based on one or more factors, the environment sensing RF signal comprising an RF signal configured to transmit information on one or more orthogonal frequency division multiplexing (OFDM) symbols; and receiving the environment sensing RF signal from the UE, wherein the one or more transmission parameters comprise a power control for the environment sensing RF signal, a bandwidth configuration for the environment sensing RF signal, a time duration configuration for the environment sensing RF signal, an antenna configuration for the environment sensing RF signal, or any combination thereof.

12. The method of claim 11, wherein:

the one or more transmission parameters comprise at least the power control for the environment sensing RF signal, and the one or more factors comprise:

a sensing granularity to be provided by the environment sensing RF signal, an amount of interference permitted for the environment sensing RF signal, a type of application for which the environment sensing RF signal is being transmitted, a transmission power permitted to the UE, or any combination thereof.

13. The method of claim 11, wherein:

the one or more transmission parameters comprise at least the bandwidth configuration for the environment sensing RF signal, and the one or more factors comprise:

a sensing range resolution to be provided by the environment sensing RF signal, a type of application for which the environment sensing RF signal is being transmitted, a maximum bandwidth capability of the UE, or any combination thereof.

14. The method of claim 11, wherein:

the one or more transmission parameters comprise at least the time duration configuration for the environment sensing RF signal, and the one or more factors comprise:

a sensing Doppler resolution to be provided by the environment sensing RF signal, a type of application for which the environment sensing RF signal is being transmitted, a Doppler computation capability of the UE, an amount of time and frequency resources allocated to the environment sensing RF signal, or any combination thereof.

15. The method of claim 11, wherein:

the one or more transmission parameters comprise at least the antenna configuration for the environment sensing RF signal, and the one or more factors comprise:

a sensing angular resolution to be provided by the environment sensing RF signal, a type of application for which the environment sensing RF signal is being transmitted, a size of an antenna array of the UE, or any combination thereof.

16. The method of claim 11, wherein the environment sensing RF signal is in a 60 gigahertz (GHz) frequency band, a millimeter wave (mmW) frequency band, or a terahertz (THz) frequency band.

17. The method of claim 11, further comprising:

receiving a reflected RF signal, the reflected RF signal comprising a reflection of the environment sensing RF signal from an object in a path of the environment sensing RF signal.

18. The method of claim 17, further comprising:

classifying the object based on the reflected RF signal;

classifying a motion state of the object based on the reflected RF signal; or classifying both the object and the motion state of the object based on the reflected RF signal.

19. A method of environment sensing performed by an electronic device, comprising:

transmitting an environment sensing radio frequency (RF) signal carrying information on one or more orthogonal frequency division multiplexing (OFDM) symbols; and receiving a reflected RF signal, the reflected RF signal comprising a reflection of the environment sensing RF signal from an object in a path of the environment sensing RF signal.

20. The method of claim 19, wherein the one or more OFDM symbols are configured for transmission of a sounding reference signal (SRS), a physical uplink control channel (PUCCH), or a physical uplink shared channel (PUSCH).

21. The method of claim 19, wherein the one or more OFDM symbols are configured for transmission of a positioning reference signal (PRS), a physical downlink control channel (PDCCH), or a physical downlink shared channel (PDSCH).

22. The method of claim 19, further comprising:

receiving a transmission configuration of the one or more OFDM symbols.

23. The method of claim 22, wherein the transmission configuration indicates that:

the environment sensing RF signal is to be transmitted with a bandwidth above a bandwidth threshold, the bandwidth threshold based on a bandwidth of RF signals configured for wireless communications, the environment sensing RF signal is to be transmitted at a transmit power below a transmit power threshold, the transmit power threshold based on a transmit power threshold of RF signals configured for wireless communications, the environment sensing RF signal is to be transmitted with a time-division duplex (TDD) density pattern above a TDD density pattern threshold, the TDD density pattern threshold based on a TDD density pattern of RF signals configured for wireless communications, the environment sensing RF signal is a repetition of an RF signal configured for wireless communications, or any combination thereof.

24. The method of claim 22, further comprising:

transmitting a request to be configured with time and/or frequency resources for the environment sensing RF signal, wherein the transmission configuration is received in response to the request.

25. A method of environment sensing performed by a user equipment (UE), comprising:

transmitting, to a base station, an environment sensing radio frequency (RF) signal comprising a physical random-access channel (PRACH) preamble; and receiving a reflected RF signal, the reflected RF signal comprising a reflection of the environment sensing RF signal from an object in a path of the environment sensing RF signal.

26. The method of claim 25, wherein the reflected RF signal is received when the UE is in a radio resource control (RRC) idle state or an RRC inactive state.

27. The method of claim 25, wherein the reflected RF signal is received when the UE is in an RRC connected state.

28. The method of claim 25, wherein:

the reflected RF signal is received when the UE is within a configured pattern, and the configured pattern comprises a time multiplexing pattern, or a combination of an RRC idle state or RRC inactivate or RRC connected state.

* * * * *